(12) United States Patent
Mori et al.

(10) Patent No.: US 12,443,549 B2
(45) Date of Patent: Oct. 14, 2025

(54) MEMORY SYSTEM AND CONTROL METHOD

(71) Applicant: Kioxia Corporation, Tokyo (JP)

(72) Inventors: Haruka Mori, Kawasaki Kanagawa (JP); Mitsunori Tadokoro, Fujisawa Kanagawa (JP)

(73) Assignee: Kioxia Corporation, Tokyo (JP)

( * ) Notice: Subject to any disclaimer, the term of this patent is extended or adjusted under 35 U.S.C. 154(b) by 38 days.

(21) Appl. No.: 18/113,483

(22) Filed: Feb. 23, 2023

(65) Prior Publication Data
US 2023/0376433 A1 Nov. 23, 2023

(30) Foreign Application Priority Data
May 19, 2022 (JP) .................................. 2022-082335

(51) Int. Cl.
*G06F 13/16* (2006.01)
*G06F 13/22* (2006.01)

(52) U.S. Cl.
CPC ...... *G06F 13/1673* (2013.01); *G06F 13/1689* (2013.01); *G06F 13/22* (2013.01)

(58) Field of Classification Search
CPC .......................... G06F 3/0653; G06F 11/1048
See application file for complete search history.

(56) References Cited

U.S. PATENT DOCUMENTS

| 7,840,775 B2 | 11/2010 | Shimada |
| 11,024,361 B2 | 6/2021 | Li et al. |
| 11,086,520 B2 | 8/2021 | Schmisseur et al. |
| 2017/0262563 A1* | 9/2017 | Hutton ................... G06F 30/347 |
| 2019/0171377 A1* | 6/2019 | Watanabe ............... G06F 13/00 |
| 2019/0266045 A1* | 8/2019 | Sato ...................... G06F 11/1048 |
| 2019/0361605 A1* | 11/2019 | Kanno .................. G06F 3/0688 |
| 2021/0181943 A1* | 6/2021 | Jang ...................... G06F 3/0659 |

FOREIGN PATENT DOCUMENTS

JP 2008-257572 A 10/2008

* cited by examiner

*Primary Examiner* — Getente A Yimer
(74) *Attorney, Agent, or Firm* — Maier & Maier, PLLC

(57) ABSTRACT

A memory system includes a memory controller and a first number of memory elements connected to the memory controller via one or more channels. The memory controller includes a second number of polling circuits and a first processor. Each polling circuit receives designation of one memory element out of the first number of memory elements and executes a polling operation. The polling operation is an operation to repeat an inquiry to the designated memory element until detecting that a status of the designated memory element is a ready status. The first processor selects a polling circuit that is not executing the polling operation among the second number of polling circuits. The first processor designates, for the selected polling circuit, one memory element out of the first number of memory elements and causes the selected polling circuit to execute the polling operation on the designated one memory element.

12 Claims, 14 Drawing Sheets

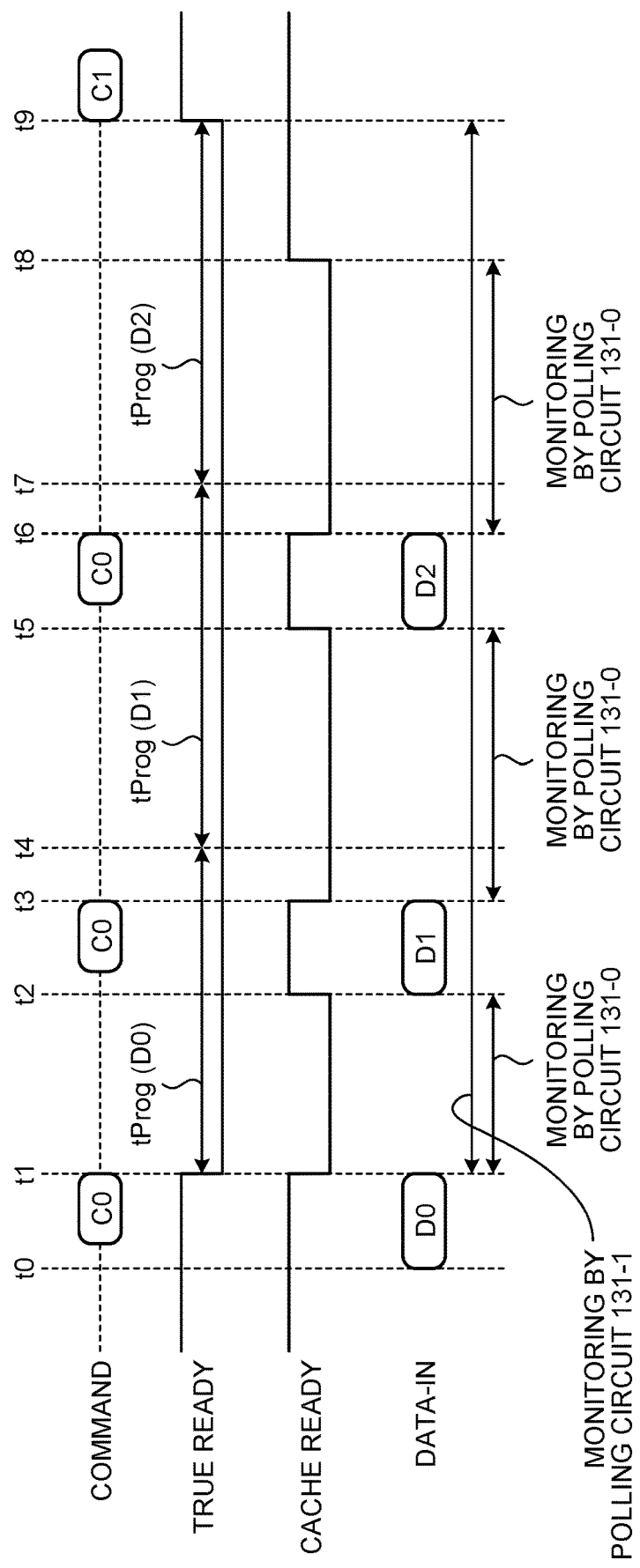

MEMORY SYSTEM AND CONTROL METHOD

CROSS-REFERENCE TO RELATED APPLICATIONS

This application is based upon and claims the benefit of priority from Japanese Patent Application No. 2022-082335, filed on May 19, 2022; the entire contents of which are incorporated herein by reference.

FIELD

Embodiments described herein relate generally to a memory system and a method.

BACKGROUND

There is a known memory system that includes a plurality of memory elements and a memory controller controlling the memory elements. The memory controller operates the memory elements in parallel by a bank interleaving method. Each of the memory elements is, for example, a memory chip of NAND flash memory.

BRIEF DESCRIPTION OF THE DRAWINGS

FIG. 16 is a timing chart illustrating an example of an execution timing of the polling operation in the cache write operation according to the second embodiment.

DETAILED DESCRIPTION

Figure 1:
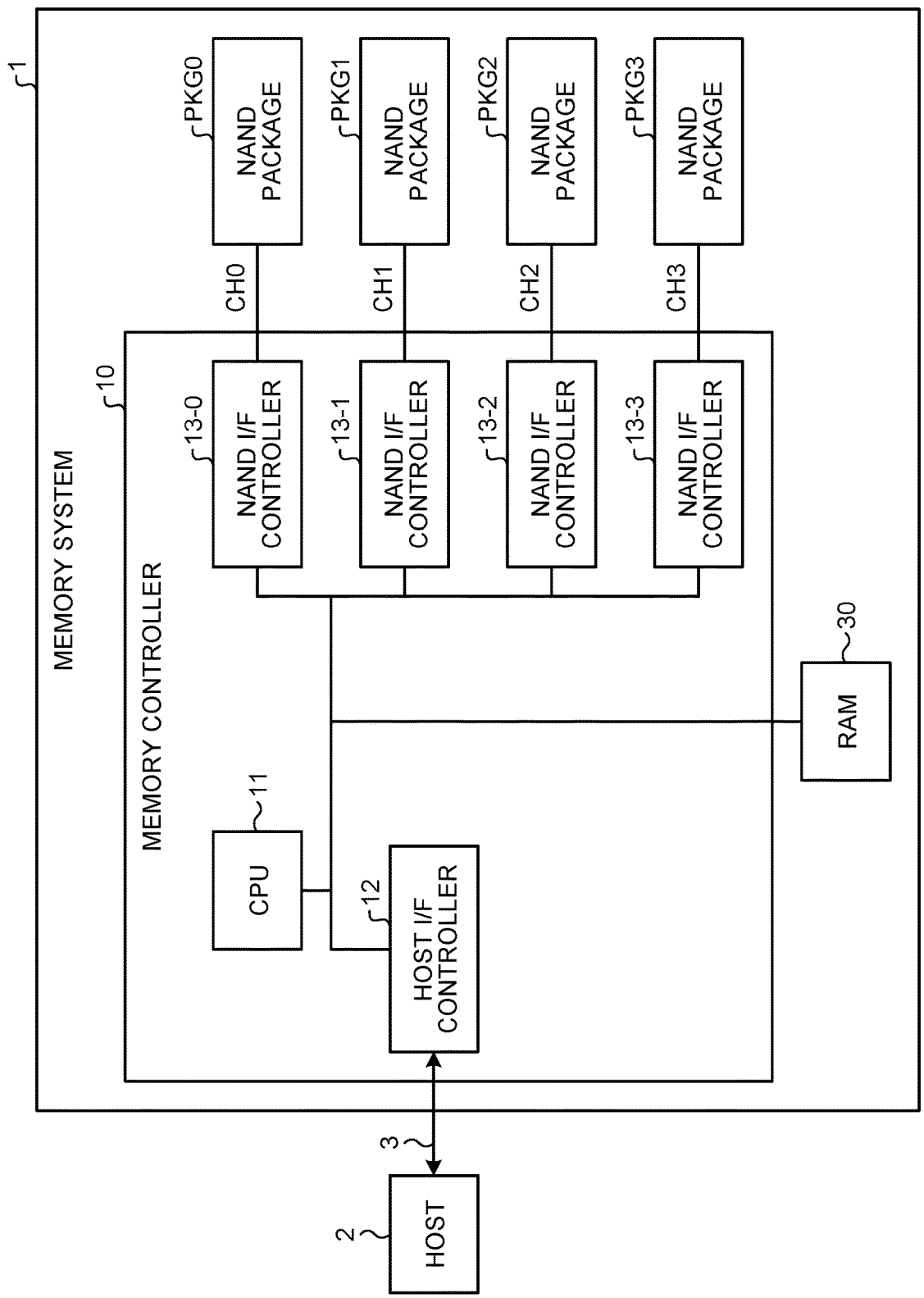
FIG. 1 is a schematic diagram illustrating an example of a hardware configuration of a memory system according to a first embodiment.

According to the present embodiment, a memory system includes one or more channels, a memory controller, and a first number of memory elements connected to the controller via the one or more channels. The memory controller includes a second number of polling circuits and a first processor. Each of the second number of polling circuits is configured to receive designation of one memory element out of the first number of memory elements and execute a polling operation. The polling operation is an operation to repeat an inquiry to the designated memory element until detecting that a status of the designated memory element is a ready status. The first processor is configured to select a polling circuit that is not executing the polling operation among the second number of polling circuits. The first processor is also configured to designate, for the selected polling circuit, one memory element out of the first number of memory elements and cause the selected polling circuit to execute the polling operation on the designated one memory element.

In the memory system according to the embodiment, the memory controller operates a plurality of memory elements in parallel by a bank interleaving method. In a case where the plurality of memory elements are operated in parallel in a bank interleaving method, each memory element is referred to as a bank. The memory controller is provided with a function to perform polling on each memory element to check whether each memory element is in a ready status or a busy status. The ready status is a status where the memory element can receive a command instructing input/output of data or execution of an internal operation. The busy status is a status where the memory element cannot receive any of commands for instructing input/output of data or execution of an internal operation. The function to performing polling each memory element is implemented as a hardware circuit. The hardware circuit having such a function of polling is referred to as a polling circuit.

A technique to be compared with the embodiment will be described. The technique to be compared with the embodiment is denoted as a comparative example. In the comparative example, a memory controller includes a plurality of polling circuits. Each polling circuit and each bank are associated one-to-one by hardware coding. The correspondence between each polling circuit and each bank is fixed. Each polling circuit performs polling only for one bank associated therewith. Therefore, for example, if the number of banks implemented in the memory system is smaller than the number of polling circuits included in the memory controller, a redundant polling circuit would be useless. If the number of banks implemented in the memory system is larger than the number of polling circuits included in the memory controller, it would be difficult to control the extra banks by the polling circuits.

A memory system is typically required to handle each bank equivalently. Therefore, it is likely to adopt a configuration in which the polling is controlled regardless of a limitation of a hardware circuit, rather than a configuration in which the polling for some banks are controlled by a polling circuit and the polling for other banks are not controlled by a polling circuit. In a case where a configuration in which the polling is controlled regardless of a limitation of a hardware circuit is adopted in the comparative example, some polling circuits included in the memory controller would be useless.

In view of the above, the memory controller according to the embodiment is configured to be able to dynamically allocate a bank to each of the plurality of polling circuits. With this configuration, even when the number of banks implemented in the memory system is larger than the number of polling circuits, it is possible to perform equivalent control using a plurality of polling circuits on each bank.

In addition, in the bank interleaving, not all the banks are operated at any moment. For example, in a case where the memory system has eight banks, the maximum number of banks, which can operate in parallel at each moment, might be less than eight. According to the embodiment, in a case where the maximum number of banks that can operate in parallel at each moment is four, with four polling circuits provided in the memory controller by a designer, it is possible to achieve performance equivalent to the case having eight polling circuits associated one-to-one with one bank. That is, according to the embodiment, it is possible to suppress an increase in the circuit scale (specifically, the number of polling circuits) while suppressing deterioration in performance.

Hereinafter, a memory system and a method according to embodiments will be described in detail with reference to the accompanying drawings. Note that the present invention is not limited by these embodiments.

First Embodiment

FIG. 1 is a schematic diagram illustrating an example of a hardware configuration of a memory system according to a first embodiment.

A memory system 1 is configured to be connectable to a host 2. The connection standard between the memory system 1 and the host 2 is not limited to a specific standard. Examples of the host 2 include a personal computer, a portable information terminal, and a server.

When accessing the memory system 1, the host 2 transmits an access request to the memory system 1. The access request is a write request, a read request, or the like.

The memory system 1 includes a memory controller 10, one or more NAND packages PKG, and a random access memory (RAM) 30. Here, as an example, as one or more NAND packages PKG, the memory system 1 specifically includes a NAND package PKG0, a NAND package PKG1, a NAND package PKG2, and a NAND package PKG3.

Each NAND package PKG is a package that includes a plurality of memory chips (memory chips MC to be described below) sealed with resin or the like. Each memory chip MC is, for example, a NAND flash memory chip, and is capable of nonvolatile storage of input data. The four NAND packages PKG function as a storage of data received from the host 2.

The memory controller 10 executes entire control of the memory system 1 including control of data transfer between the host 2 and the four NAND packages PKG.

The RAM 30 includes a region for buffering data transferred between the host 2 and the four NAND packages PKG and a region for buffering or caching various management data used for control by the memory controller 10. The management data includes, for example, logical to physical (L2P) address translation information in which a correspondence relationship between a logical address and a physical address is recorded.

The memory controller 10 and the four NAND packages PKG are connected by different channels, respectively. Specifically, the memory system 1 includes a channel CH0, a channel CH1, a channel CH2, and a channel CH3. The memory controller 10 and the NAND package PKG0 are connected to each other via the channel CH0. The memory controller 10 and the NAND package PKG1 are connected to each other via the channel CH1. The memory controller 10 and the NAND package PKG2 are connected to each other via the channel CH2. The memory controller 10 and the NAND package PKG3 are connected to each other via the channel CH3.

The memory controller 10 is able to control the four channels independently. The memory controller 10 is able to access the four NAND packages PKG in parallel by operating the four channels in parallel.

The memory controller 10 includes a CPU 11, a host interface (I/F) controller 12, and one or more NAND interface (I/F) controllers 13 individually connected to the channels. The memory controller 10 is provided with, as the one or more NAND I/F controllers 13, a NAND I/F controller 13-0, a NAND I/F controller 13-1, a NAND I/F controller 13-2, and a NAND I/F controller 13-3.

The NAND I/F controller 13-0 is connected to the channel CH0 and configured to control communication between the memory controller 10 and the NAND package PKG0 via the channel CH0. The NAND I/F controller 13-1 is connected to the channel CH1 and configured to control communication between the memory controller 10 and the NAND package PKG1 via the channel CH1. The NAND I/F controller 13-2 is connected to the channel CH2 and configured to control communication between the memory controller 10 and the NAND package PKG2 via the channel CH2. The NAND I/F controller 13-3 is connected to the channel CH3 and configured to control communication between the memory controller 10 and the NAND package PKG3 via the channel CH3.

The host I/F controller 12 controls communication between the host 2 and the memory controller 10 via a communication path 3.

The CPU 11 controls the memory controller 10 on the basis of a firmware program. The firmware program is stored in advance in any memory chip MC of one of the NAND packages PKG, for example, and is loaded from the memory chip MC to the RAM 30 at startup of the memory system 1. The CPU 11 executes the firmware program in the RAM 30. The storage location of the firmware program is not limited to the memory chip MC. The function of each unit of the memory controller 10 may be implemented by dedicated hardware, the CPU 11 that executes the firmware program, or a combination thereof.

Figure 2:
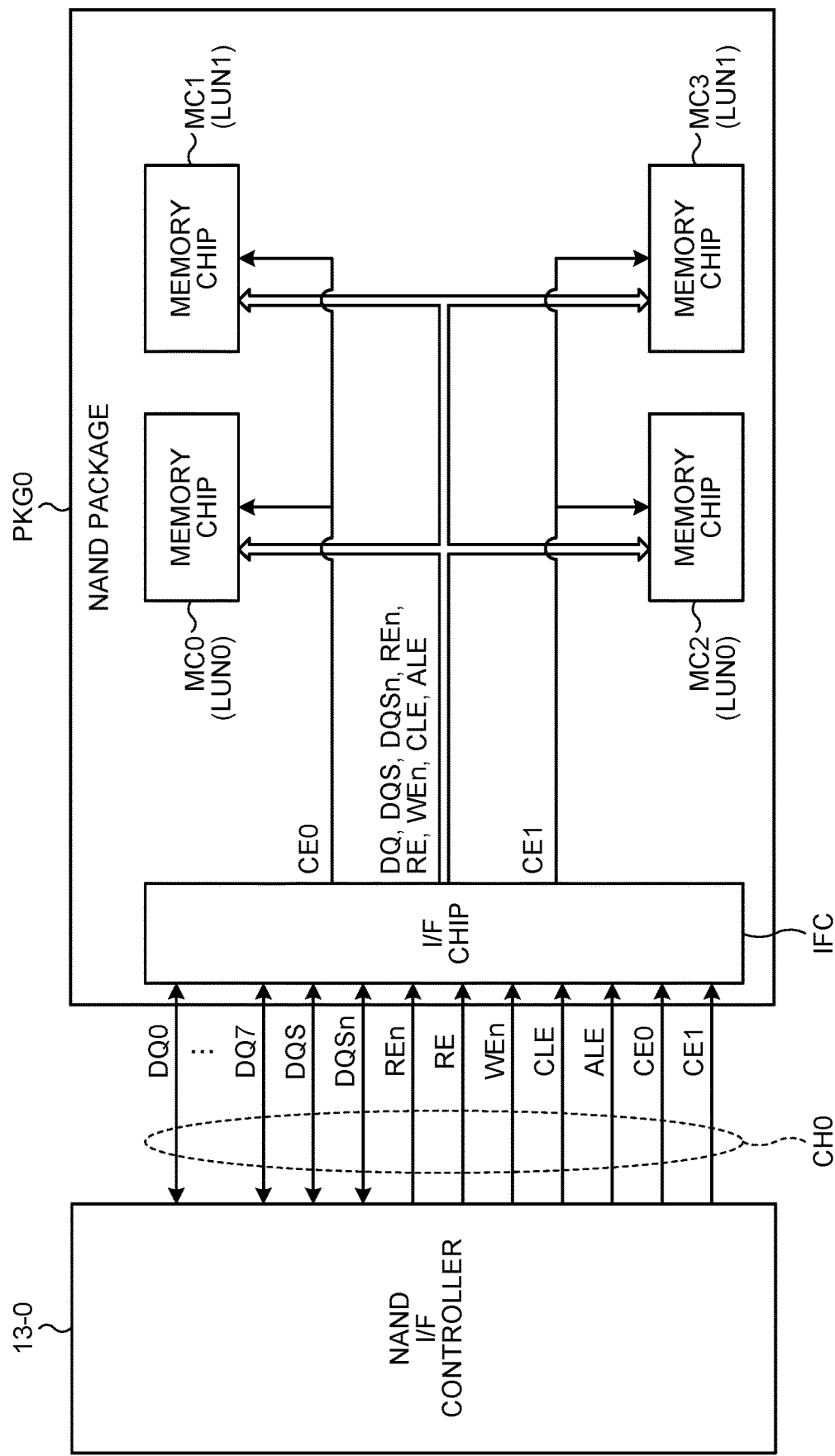
FIG. 2 is a schematic diagram illustrating an example of a configuration of a NAND package according to the first embodiment.

FIG. 2 is a schematic diagram illustrating an example of a configuration of the NAND package PKG according to the first embodiment. The four NAND packages PKG have the same configuration in common. In FIG. 2, a configuration of the NAND package PKG0 as a representative of the four NAND packages PKG is illustrated. In FIG. 2, an example of a configuration of the channel CH0 connected to the NAND package PKG0 is also illustrated. The other three channels have the same configuration as the channel CH0.

The channel CH0 includes: a signal line that transfers data signals DQ0 to DQ7; a pair of signal lines that transfers data strobe signals DQS/DQSn; a pair of signal lines that transfers read enable signals REn/RE; a signal line that transfers a write enable signal WEn; a signal line that transfers a command latch enable signal CLE; a signal line that transfers an address latch enable signal ALE; a signal line that transfers a chip enable signal CE0; and a signal line that transfers a chip enable signal CE1. Note that "n" written at the end of a sign name for a signal represents that the signal is operated with negative logic. Whether each signal operates with negative logic or positive logic may be optionally designed. In addition, here, the data signal is transferred as the signals DQ0 to DQ7 having an 8-bit width, but the bit width of the data signal is not limited to 8 bits. In addition, the channel CH0 may include a signal line that transfers any signal other than these signals. Moreover, the channel CH0 may not include part of these signal lines.

Each of the chip enable signals CE0 and CE1 is a signal for collectively enabling one or more memory chips MC including a memory chip MC of an access target. The data strobe signals DQS and DQSn are signals instructing a counterpart device to capture data transmitted as the data signals DQ0 to DQ7. The data strobe signals DQS and DQSn constitute differential signals. The read enable signals REn and RE are signals instructing the NAND package PKG0 to output the data signals DQ0 to DQ7. Note that the read enable signals REn and RE constitute differential signals. The write enable signal WEn is a signal instructing the NAND package PKG0 to capture a command or an address transmitted by the data signals DQ0 to DQ7. The command latch enable signal CLE is a signal indicating to the NAND package PKG0 that the data signals DQ0 to DQ7 are commands. The address latch enable signal ALE is a signal indicating to the NAND package PKG0 that the data signals DQ0 to DQ7 are addresses.

The NAND package PKG0 includes an interface (I/F) chip IFCs and a plurality of memory chips MC. Here, as an example, the NAND package PKG0 includes four memory chips MC0 to MC3 as the plurality of memory chips MC. Note that the NAND package PKG0 does not necessarily need to include the I/F chip IFC.

The I/F chip IFC is connected with the channel CH0. That is, the interface chip IFC is connected to the NAND I/F controller 13-0 via the channel CH0. The interface chip IFC transfers the signals DQ0 to DQ7, DQS, DQSn, REn, RE, WEn, CLE, ALE, CE0, and CE1 between the NAND I/F controller 13-0 and the four memory chips MC0 to MC3.

The NAND package PKG0 internally includes a signal line that transfers the chip enable signal CE0 and a signal line that transfers the chip enable signal CE1. These signal lines are connected to the I/F chip IFC. The signal line that transfers the chip enable signal CE0 is connected to the memory chip MC0 and the memory chip MC1 in a shared manner, while the signal line that transfers the chip enable signal CE1 is connected to the memory chip MC2 and the memory chip MC3 in a shared manner. That is, the NAND package PKG0 is constituted such that the memory chips MC0 and MC1 are collectively selected by the chip enable signal CE0, and the memory chips MC2 and MC3 are collectively selected by the chip enable signal CE1.

Inside the NAND package PKG0, there is provided a signal line group for transferring the signals DQ0 to DQ7, DQS, DQSn, REn, RE, WEn, CLE, and ALE. This signal line group is connected to the I/F chip IFC. In addition, the signal line group is connected to four memory chips MC0 to MC3 in a shared manner.

The two memory chips MC0 and MC1 selected by the chip enable signal CE0 are each provided with a logical unit number (LUN) as a unique identification number in the range of the two memory chips MC0 and MC1. Here, as an example, LUN0 is given to the memory chip MC0, and LUN1 is given to the memory chip MC1.

Similarly, the two memory chips MC2 and MC3 selected by the chip enable signal CE1 are each provided with an LUN as a unique identification number in the range of the two memory chips MC2 and MC3. Here, as an example, LUN0 is given to the memory chip MC2, and LUN1 is given to the memory chip MC3.

Consequently, the NAND package PKG0 is constituted so that each of the four memory chips MC0 to MC3 in the NAND package PKG0 can be specified by the combination of the chip enable signal and the LUN.

Figure 3:
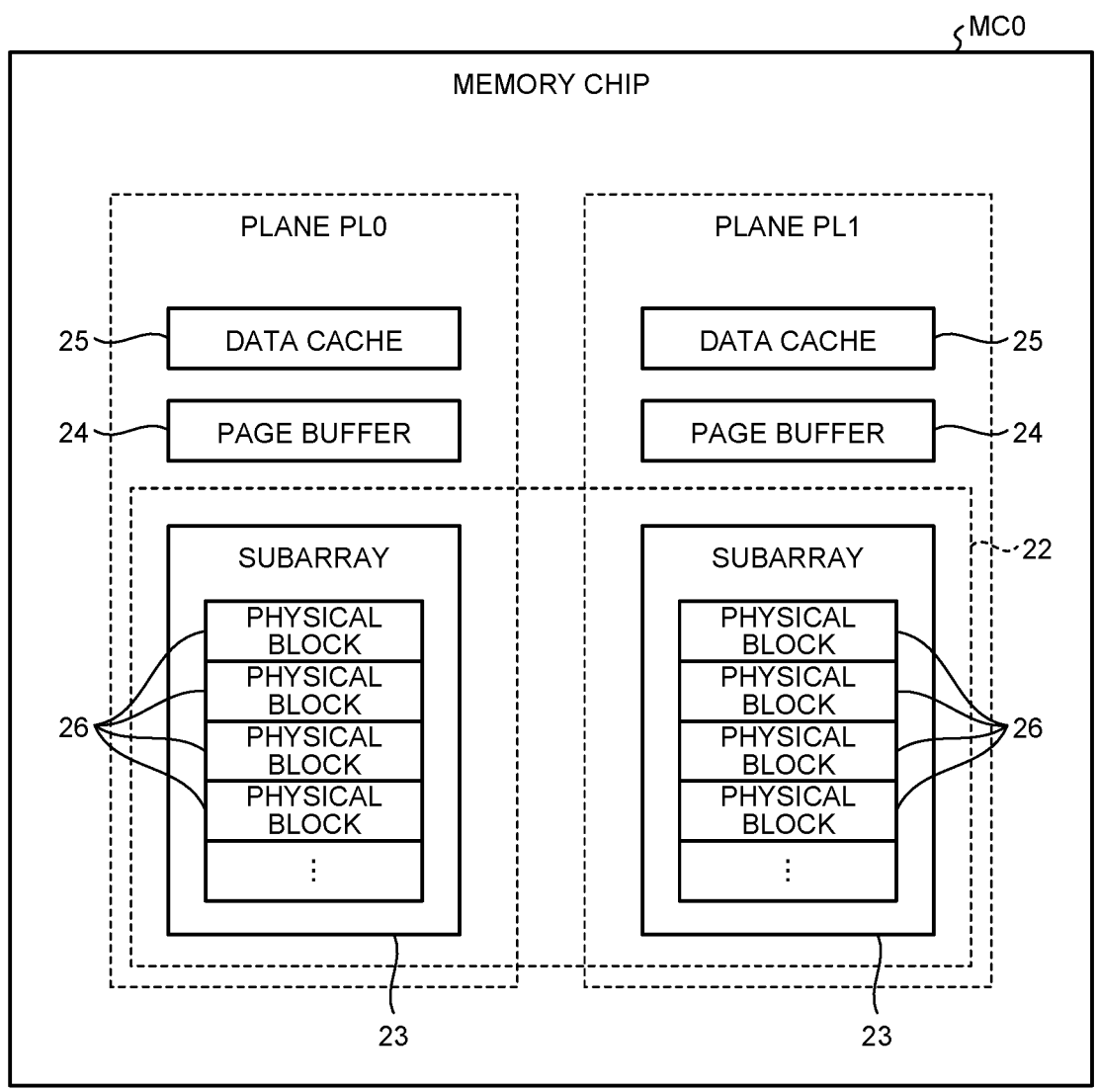
FIG. 3 is a schematic diagram illustrating an example of a configuration of a memory chip according to the first embodiment.

FIG. 3 is a schematic diagram illustrating an example of a configuration of the memory chip MC according to the first embodiment. The memory chips MC0 to MC3 included in the NAND packages PKG0 to PKG3 have the same configuration in common. In FIG. 3, a configuration of the memory chip MC0 included in a certain NAND package PKG is illustrated as a representative of these memory chips MC.

According to the example illustrated in FIG. 3, the memory chip MC0 includes a memory cell array 22 divided into two subarrays 23, two page buffers 24, and two data caches 25. The page buffer 24 and the data cache 25 are each formed with a volatile memory that can be accessed faster than the subarray 23 and can be accessed in parallel with the subarray 23. Each of the page buffer 24 and the data cache 25 is formed with, for example, a static random access memory (SRAM). The page buffer 24 and the data cache 25 may be formed with flip-flops. The access to the memory cell array 22 includes operations such as write (also referred to as program), read, and erase. Each subarray 23 constitutes one plane with one of the two page buffers 24 and one of the two data caches 25. That is, the memory chip MC0 includes two planes. The two planes are operable independently of each other. Each plane in each memory chip MC0 is identified by a plane number. Note that the number of planes included in the memory chip MC0 is not limited to two. Further, the memory chip MC0 may not be divided into a plurality of planes.

A series of operations in which the memory chip MC receives data input from the memory controller 10 and the memory chip MC writes the input data to the memory cell array 22 is referred to as a write operation in the present specification. The data input from the memory controller 10 to the memory chip MC is also referred to as write data. A series of operations in which the memory chip MC reads data from the memory cell array 22 and outputs the data to the memory controller 10 is referred to as a read operation. The data output from the memory chip MC to the memory controller 10 is also referred to as read data.

In the write operation, the memory chip MC0 receives the write data input from the memory controller 10 to the data cache 25. The operation to input the write data from the memory controller 10 to the data cache 25 is also referred to as a data-in operation. After the data-in operation, the memory chip MC0 transfers the write data received in the data cache 25 to the page buffer 24, and after completion of the transfer, writes the write data from the page buffer 24 to the memory cell array 22. The operation to write data from the page buffer 24 to the memory cell array 22 is also referred to as a program operation.

In the read operation, the memory chip MC0 first transfers read data from the memory cell array 22 to the page buffer 24. The operation to transfer the read data from the memory cell array 22 to the page buffer 24 is also referred to as a sense operation. The memory chip MC0 transfers the read data stored in the page buffer 24 by the sense operation from the page buffer 24 to the data cache 25. Subsequently, the memory chip MC0 outputs the read data from the data cache 25 to the memory controller 10. The operation to output the read data from the data cache 25 to the memory controller 10 is also referred to as a data-out operation.

In the manner described above, the page buffer 24 is configured to buffer data to be written to the memory cell array 22 and configured to buffer data read from the memory cell array 22. In addition, the data cache 25 is configured to buffer or cache transfer data to/from the memory controller 10.

Each subarray 23 includes a plurality of physical blocks 26. Data written in one physical block 26 is erased collectively.

Each physical block 26 includes a plurality of pages. A page is a storage region of a unit of writing data by the write operation and reading data by the read operation to/from the subarray 23. Each data cache 25 and each page buffer 24 have a storage capacity of at least one page so that the read operation and the write operation can be executed in units of pages from/to the subarray 23.

In this manner, one NAND package PKG includes the four memory chips MC, and each of the four memory chips MC includes two planes. Therefore, one NAND package PKG includes a total of eight planes. The memory controller 10 operates the eight planes included in each NAND package PKG in parallel by a bank interleaving method. That is, each plane corresponds to one memory element among a plurality of memory elements operable in parallel by a bank interleaving method, that is, a bank.

According to the configuration illustrated in FIGS. 1 to 3, each bank is specified by the combination of the chip enable signal CE, LUN, and the plane number. Each of the LUN and the plane number is transferred in DQ0 to DQ7 as a part of the address. Hereinafter, the plane number may be referred to as PL #. In addition, a plane having a plane number X (X is an integer) may be referred to as a plane PL #X.

Figure 4:
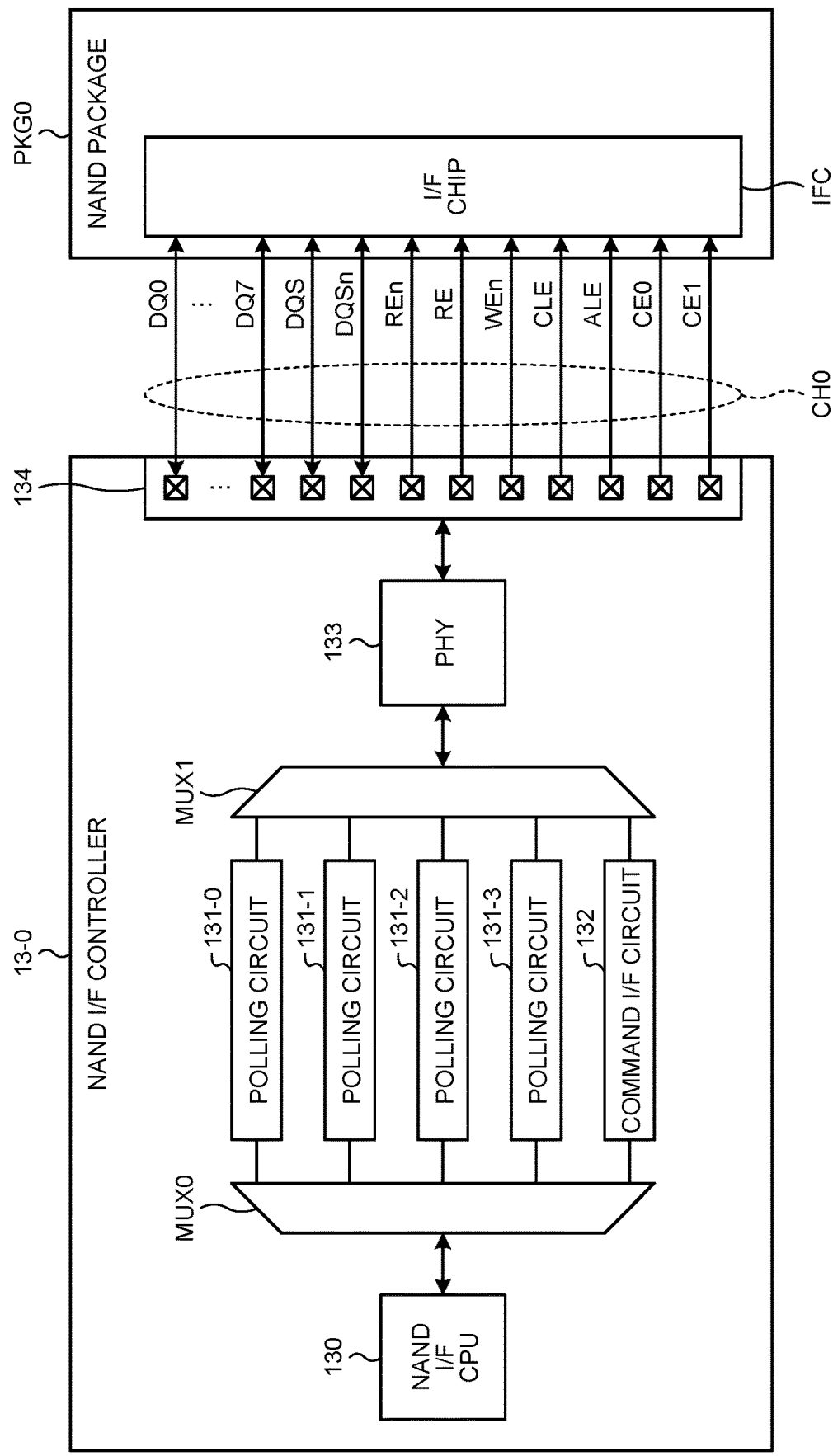
FIG. 4 is a schematic diagram illustrating an example of a configuration of a NAND I/F controller according to the first embodiment.

FIG. 4 is a schematic diagram illustrating an example of a configuration of the NAND I/F controller 13 according to the first embodiment. Note that the NAND I/F controllers 13-0 to 13-3 have the same configuration in common. In FIG. 4, a configuration of the NAND I/F controller 13-0 as a representative of the NAND I/F controllers 13-0 to 13-3 is illustrated.

The NAND I/F controller 13-0 includes a NAND interface (I/F) CPU 130, multiplexers MUX0 and MUX1, four polling circuits 131-0 to 131-3, a command interface (I/F) circuit 132, a PHY circuit 133, and a terminal group 134.

The terminal group 134 is a group of terminals to which a signal line group constituting the channel CH0 is connected. The PHY circuit 133 is a circuit that controls communication via the terminal group 134.

The NAND I/F CPU 130 controls access to the NAND package PKG0 in response to a request from a high-level CPU (for example, the CPU 11).

For example, in a case that a write operation is requested, the NAND I/F CPU 130 first transmits a data-in command and write data to a target bank among the eight banks included in the NAND package PKG0. The data-in command is a command instructing reception of write data by a data-in operation. After completion of the data-in operation, the NAND I/F CPU 130 transmits a program command to the target bank. The program command is a command instructing execution of a program operation. The target bank starts the program operation in accordance with the program command, and the status of the target bank transitions from a ready status to a busy status. When the target bank completes the program operation, the status of the target bank transitions from the busy status to the ready status. After transition of the status of the target bank from the busy status to the ready status, the NAND I/F CPU 130 can transmit a next command to the target bank.

In a case that a read operation is requested, the NAND I/F CPU 130 first transmits a sense command to a target bank among the eight banks included in the NAND package PKG0. The sense command is a command instructing the bank to execute a sense operation. When the target bank starts the sense operation in accordance with the sense command, the status of the target bank transitions from the ready status to the busy status. When the target bank completes the sense operation, the status of the target bank transitions from the busy status to the ready status. After the target bank completes the sense operation and has transitioned to the ready status, the NAND I/F CPU 130 transmits a data-out command to the target bank. The data-out command is a command that instructs the bank to execute a data-out operation. Read data output from the target bank is stored in the RAM 30. After completion of the storage of the read data in the RAM 30, the NAND I/F CPU 130 notifies the high-level CPU of the completion of the read operation.

In this manner, when the NAND I/F CPU 130 transmits a command to a certain bank, the bank that has received the command starts an internal operation (for example, a sense operation, a program operation, and the like) according to the command, and the status of the bank transitions to a busy status. When the bank completes the internal operation, the status of the bank becomes a ready status, and the NAND I/F CPU 130 can instruct the bank to execute a next operation.

The polling circuit 131 is used by the NAND I/F CPU 130 for checking whether a bank to which the NAND I/F CPU 130 has instructed the execution of an internal operation has completed the internal operation. After transmitting a command for executing an internal operation to a target bank, the NAND I/F CPU 130 assigns one polling circuit 131 of the four polling circuits 131 to the target bank, and causes the polling circuit 131 to monitor the status of the target bank. The polling circuit 131 assigned to the target bank executes a polling operation to repeatedly inquire the status of the target bank until the circuit detects that the status of the target bank is the ready status. In the polling operation, the polling circuit 131 transmits a status read command. The bank can respond status information in accordance with the status read command regardless of whether the internal operation is being executed. The polling circuit 131 makes a determination of the status as to whether the target bank is in a busy status or a ready status based on the status information received from the target bank in accordance with the status read command. The polling circuit 131 repeatedly executes a cycle including transmission of the status read command and reception of the status information until detection of the status change by the polling circuit 131, specifically, detection of the transition of the target bank from the busy status to the ready status and the fact that the target bank is in the ready status. In a case where the polling circuit 131 has detected that the status of the target bank being the ready status, the polling circuit 131 gives, to the NAND I/F CPU 130, a notification of the completion of the polling operation and ends the polling operation. When the polling operation is completed, the polling circuit 131 enters a state capable of performing a polling operation of the same or another bank.

The NAND I/F CPU 130 is connected to the four polling circuits 131 and the command I/F circuit 132 via the multiplexer MUX0. The four polling circuits 131 and the command I/F circuit 132 are connected to the PHY circuit 133 via the multiplexer MUX1.

The NAND I/F CPU 130 inputs a command (for example, a data-in command, a program command, a sense command, and a data-out command) addressed to each bank, to the command I/F circuit 132 via the multiplexer MUX0. The command I/F circuit 132 transmits the received command to the destination bank via the multiplexer MUX1, the PHY circuit 133, and the terminal group 134.

In addition, the NAND I/F CPU 130 can instruct part of or all the four polling circuits 131 to execute a polling operation for different banks via the multiplexer MUX0. Each polling circuit 131 instructed to execute a polling operation among the four polling circuits 131 transmits a status read command and receives status information via the multiplexer MUX1, the PHY circuit 133, and the terminal group 134. Hereinafter, the instruction to execute the polling operation is referred to as a polling instruction.

Note that the multiplexer MUX1 is able to select, at each moment, only one circuit out of the four polling circuits 131 and the command I/F circuit 132. Therefore, only one of the four polling circuits 131 and the command I/F circuit 132 can execute the transfer of the command, the response according to the command, and the data via the channel CH0 at each moment. That is, with the configuration including the multiplexer MUX1 in the NAND I/F controller 13-0, it is possible to arbitrate the right to use the channel CH0.

Figure 5:
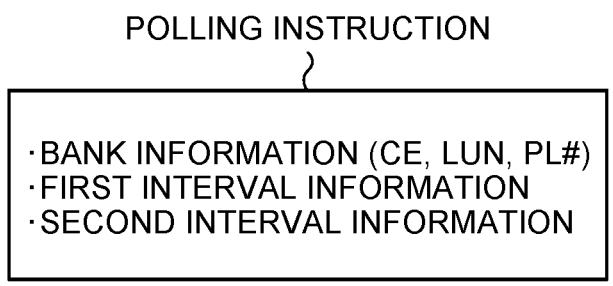
FIG. 5 is a schematic diagram illustrating an example of a data structure of a polling instruction according to the first embodiment.

FIG. 5 is a schematic diagram illustrating an example of a data structure of a polling instruction according to the first embodiment.

The polling instruction includes bank information, first interval information, and second interval information.

The bank information is information indicating a target bank, and is specifically a combination of designation of the chip enable signal CE, designation of LUN, and designation of the plane number.

The first interval information is numerical information designating an interval from reception of the polling instruction to first transmission of a status read command. When the time indicated by the first interval information has elapsed after receiving the polling instruction, the polling circuit 131 transmits the first status read command.

The second interval information is numerical information designating an interval of transmission of second and subsequent status read commands. After transmitting the first status read command, the polling circuit 131 transmits the second and subsequent status read commands at time intervals indicated by the second interval information.

According to the example illustrated in FIG. 5, the polling instruction includes two types of interval information (that is, the first interval information and the second interval information). The polling instruction does not necessarily have to include two types of interval information. It is allowable to have a configuration in which the polling instruction includes one type of interval information, and the polling circuit 131 transmits the status read command at time intervals indicated by the interval information.

Figure 6:
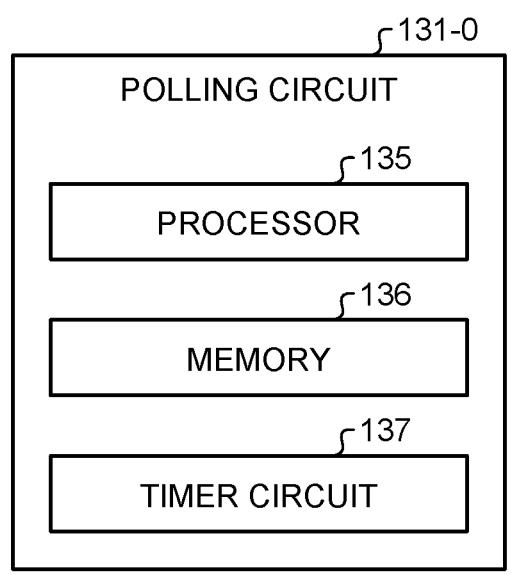
FIG. 6 is a schematic diagram illustrating an example of a configuration of a polling circuit according to the first embodiment.

FIG. 6 is a schematic diagram illustrating an example of a configuration of the polling circuit 131 according to the first embodiment. Note that the polling circuits 131-0 to 131-3 have the same configuration in common. In FIG. 6, a configuration of the polling circuit 131-0 as a representative of the polling circuits 131-0 to 131-3 is illustrated.

The polling circuit 131-0 includes a processor 135, a memory 136, and a timer circuit 137.

The memory 136 stores a command sequence of a status read command. Note that the memory 136 is not limited to a specific type of memory. The memory 136 may be implemented in the form of SRAM, a read only memory (ROM), a flip-flop, or the like.

The processor 135 transmits the status read command according to the command sequence stored in the memory 136. In addition, the processor 135 uses the timer circuit 137 to measure the lapse of time indicated by interval information (the first interval information and the second interval information) included in the polling instruction. The processor 135 controls the timer circuit 137 to repeatedly measure the lapse of time set by the interval information, and makes an inquiry to a bank at time intervals according to the command sequence stored in the memory 136. The processor 135 may be an arithmetic device that operates according to a firmware program, or may be configured by a hardware circuit such as a field-programmable gate array (FPGA) or an application specific integrated circuit (ASIC).

Next, an operation of the memory system 1 according to the first embodiment will be described. The memory controller 10 is connected to each of the NAND packages PKG0 to PKG3 via individual channels. Therefore, the memory controller 10 can access each of the NAND packages PKG0 to PKG3 independently of each other. Hereinafter, as an example, the operation will be described focusing on the NAND package PKG0.

The NAND I/F controller 13-0 can instruct a read operation and a write operation to each of the eight banks included in the NAND package PKG0. As an example of a procedure for operating one bank, a procedure of causing one bank to execute the read operation will be described.

Figure 7:
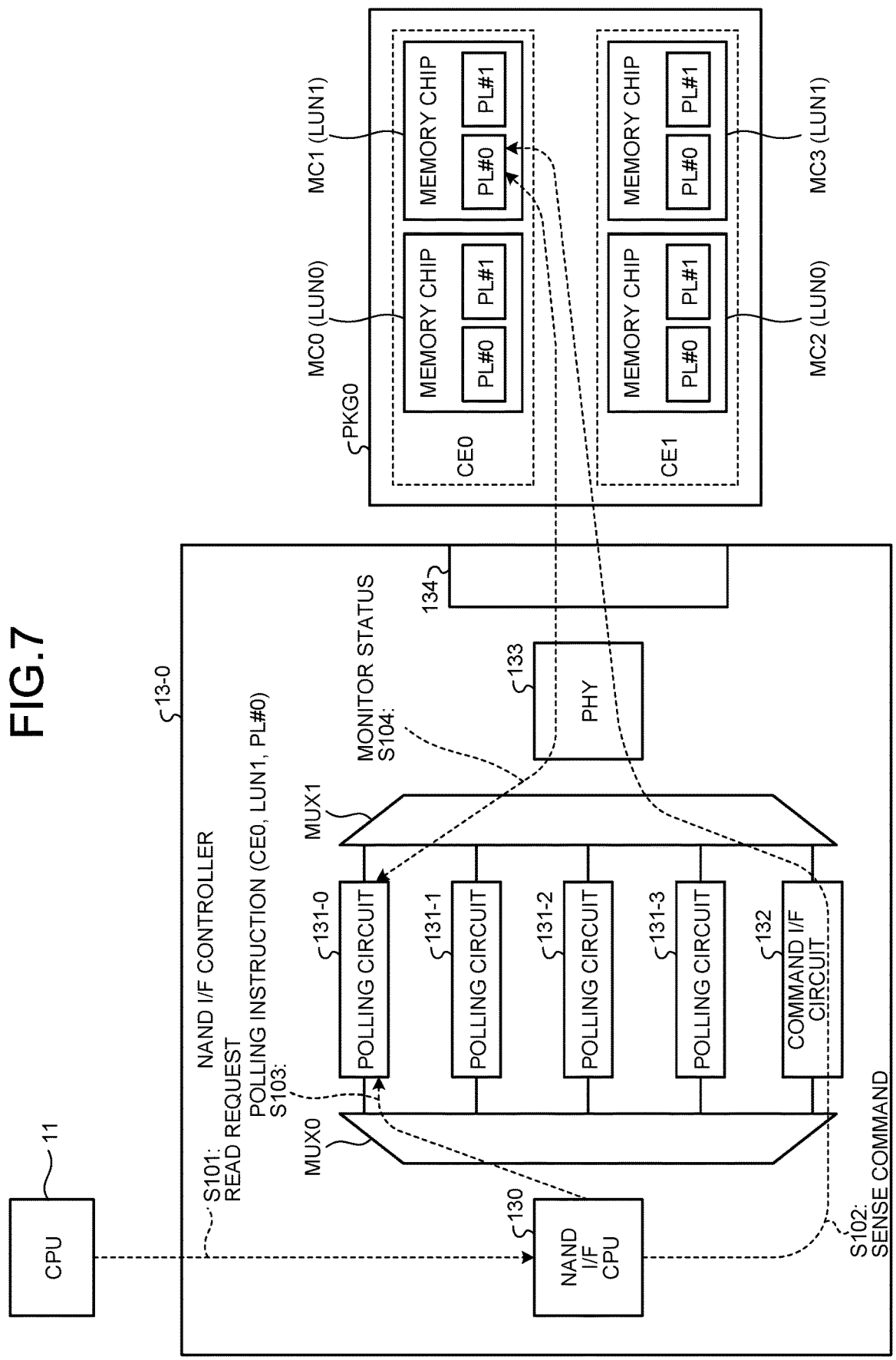
FIG. 7 is a diagram illustrating an example of a procedure of causing one bank to execute a read operation according to the first embodiment.
Figure 8:
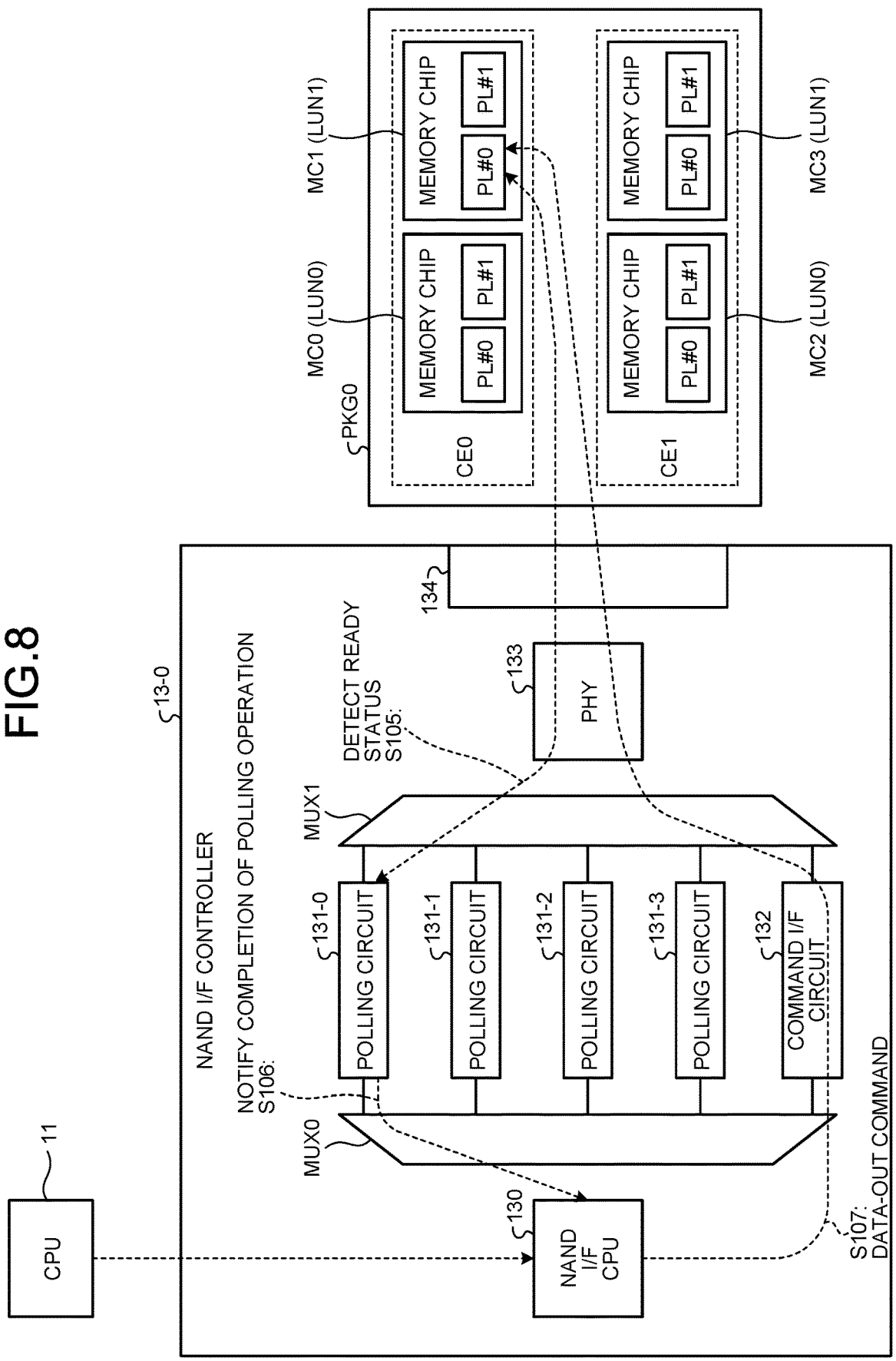
FIG. 8 is a diagram illustrating an example of a procedure of causing one bank to execute the read operation according to the first embodiment.
Figure 9:
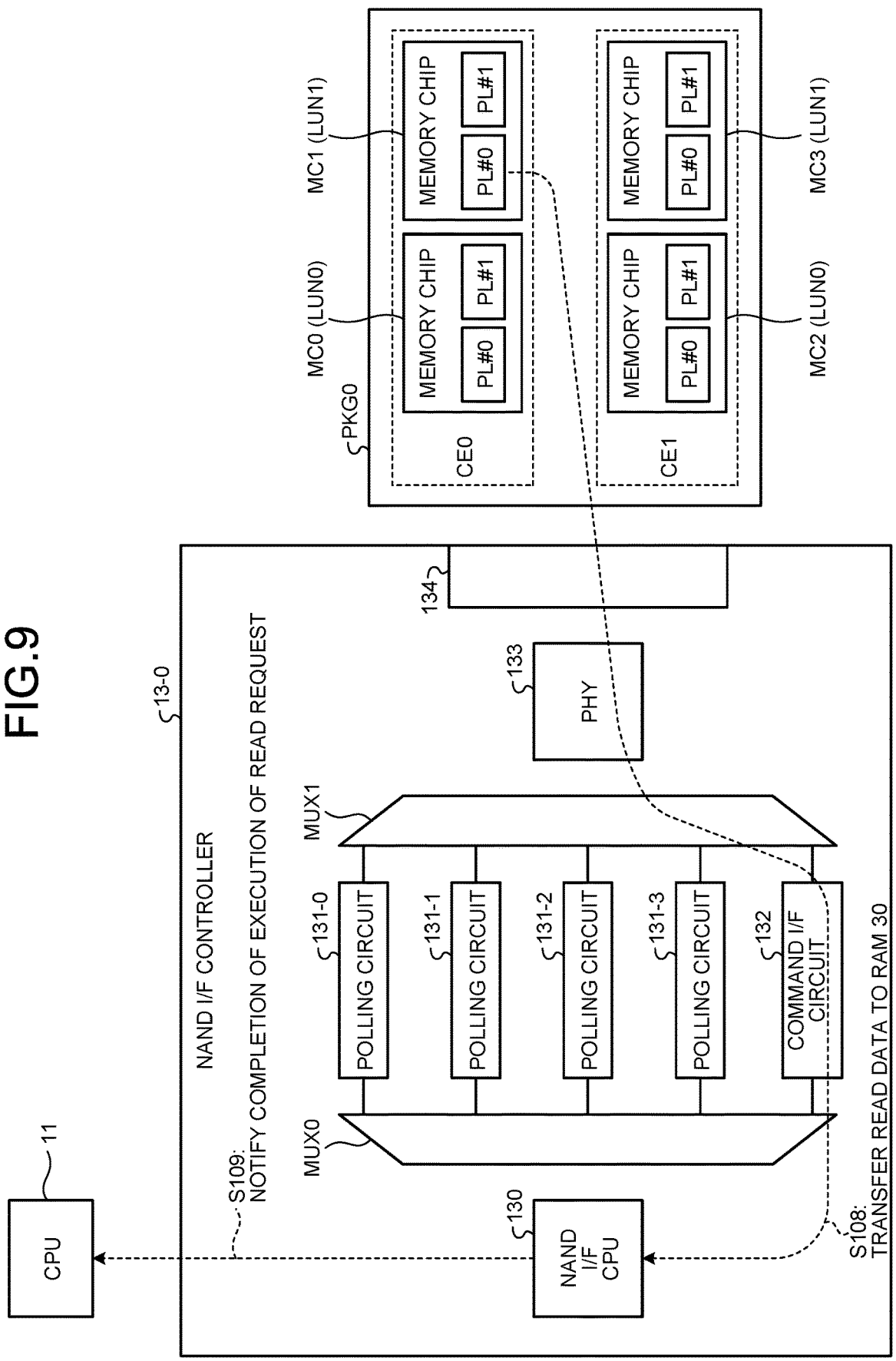
FIG. 9 is a diagram illustrating an example of a procedure for causing one bank to execute the read operation according to the first embodiment.

FIGS. 7, 8 and 9 are diagrams illustrating an example of a procedure of causing one bank to execute the read operation according to the first embodiment. Here, as an example, it is assumed that the plane PL #0 included in the memory chip MC1 is a read target bank.

As illustrated in FIG. 7, on receiving a read request from the CPU 11 (S101), the NAND I/F controller 13-0 issues a sense command that is addressed to the read target bank (S102).

The sense command is transmitted to the NAND package PKG0 via the multiplexer MUX0, the command I/F circuit 132, the multiplexer MUX1, the PHY circuit 133, and the terminal group 134. At this time, the chip enable signal CE0 is asserted. Therefore, the sense command is transmitted to the memory chips MC0 and MC1.

In addition, the plane PL #0 included in the memory chip MC1, which is the read target bank, is specified by a combination of CE0, LUN1, and PL #0. A bit group constituting the address included in the sense command includes LUN1 and PL #0 as its part accordingly. Among the memory chips MC0 and MC1 that have received the sense command, the memory chip MC1 to which the LUN #1 has been assigned recognizes that the plane PL #0 included in the memory chip MC1 is the target based on the address included in the sense command. Subsequently, the sense operation according to the sense command is started in the plane PL #0, and the status of the plane PL #0 transitions from the ready status to the busy status in accordance with the start of the sense operation.

After issuing the sense command, the NAND I/F CPU 130 selects one of the four polling circuits 131 and transmits, to the selected polling circuit 131, a polling instruction for monitoring the status of the plane PL #0 included in the memory chip MC1 (S103). A procedure of selecting the polling circuit 131 will be described below.

The polling instruction includes, as bank information, a combination of CE0, LUN1, and PL #0. In the example illustrated in FIG. 7, the polling instruction is transmitted to the polling circuit 131-0. On receiving the polling instruction, the polling circuit 131-0 starts monitoring the status of the bank designated by the bank information included in the polling instruction, that is, starts monitoring the status of the plane PL #0 included in the memory chip MC1 (S104). Specifically, the polling circuit 131-0 repeatedly executes a combination of transmission of the status read command and reception of the status information until the circuit detects that the status of the plane PL #0 included in the memory chip MC1 is the ready status. Details of the status monitoring procedure will be described below.

The description will be continued with reference to FIG. 8. On detecting that the status of the plane PL #0 included in the memory chip MC1 is the ready status after the start of the monitoring of the status (S105), the polling circuit 131-0 gives, to the NAND I/F CPU 130, a notification of the completion of the polling operation (S106).

By receiving the notification of the completion of the polling operation, the NAND I/F CPU 130 recognizes that the sense operation is completed in the plane PL #0 included in the memory chip MC1. Therefore, in order to acquire the read data transferred from the subarray 23 to the page buffer 24 by the sense operation, the NAND I/F CPU 130 issues a data-out command (S107). The data-out command is transferred to the memory chip MC1 through a path similar to the one for the sense command.

The description will be continued with reference to FIG. 9. In accordance with the data-out command, the memory chip MC1 starts outputting the read data. The read data is transferred to the RAM 30 under the control of the NAND I/F CPU 130 (S108). After completion of the transfer of the read data to the RAM 30, the NAND I/F CPU 130 notifies the CPU 11 of the completion of the execution of the read request (S109).

As described with reference to FIGS. 7 to 9, when causing a target bank to execute a read operation, the NAND I/F CPU 130 issues a sense command as a command for executing a sense operation, which is an internal operation in the read operation, and instructs one polling circuit 131 to monitor the status of the target bank. On detecting that the status of the target bank is the ready status, the polling circuit 131 completes the polling operation. Having received the notification of completion of the polling operation, the NAND I/F CPU 130 causes the target bank to execute a data-out operation as an operation subsequent to the sense operation in the read operation.

Even in a case of causing the target bank to execute the write operation, the NAND I/F CPU 130 executes the issuance of a command for causing the target bank to execute the internal operation and the instruction to monitor the status of the target bank. In the write operation, the program operation corresponds to the internal operation. On detecting that the status of the target bank is the ready status, the polling circuit 131 completes the polling operation. On receiving the notification of the completion of the polling operation, the NAND I/F CPU 130 recognizes that the program operation is completed. In a case where the NAND I/F CPU 130 has already received a request for a next operation for the target bank from the CPU 11, the NAND I/F CPU 130 can cause the target bank to execute the next operation.

In this manner, the NAND I/F controller 13-0 transmits a command for executing the internal operation and causes one polling circuit 131 to monitor the status of the target bank, thereby determining whether the target bank has completed the internal operation.

Figure 10:
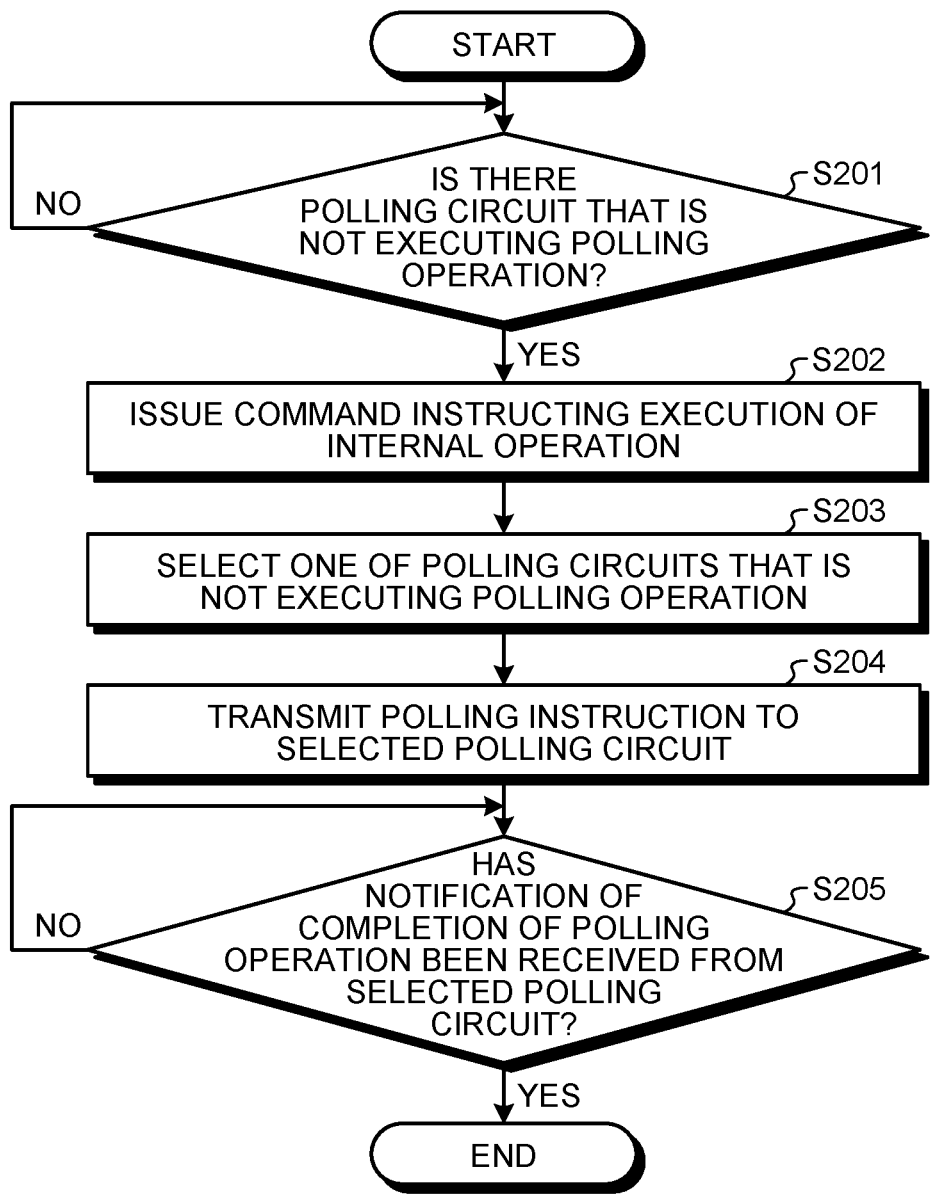
FIG. 10 is a diagram illustrating an example of a procedure of controlling the polling circuit according to the first embodiment.

FIG. 10 is a diagram illustrating an example of a procedure of controlling the polling circuit 131 by the NAND I/F CPU 130 according to the first embodiment.

Before issuing a command instructing execution of an internal operation, the NAND I/F CPU 130 determines whether there is a polling circuit 131 that is not executing a polling operation (S201). When there is no polling circuit 131 that is not executing the polling operation (S201: No), the NAND I/F CPU 130 performs the determination process of step S201 again.

When there is a polling circuit 131 that is not executing the polling operation (S201: Yes), the NAND I/F CPU 130 issues a command instructing execution of an internal operation (S202). Subsequently, the NAND I/F CPU 130 selects one of the polling circuits 131 that is not executing the polling operation (S203), and transmits a polling instruction to the selected one polling circuit 131 (S204).

Subsequently, the NAND I/F CPU 130 determines whether a notification of completion of the polling operation has been received from the selected polling circuit 131 (S205). In a case where the notification of the completion of the polling operation has not been received from the selected polling circuit 131 (S205: No), the NAND I/F CPU 130 executes the determination process of step S205 again. In a case where the notification of the completion of the polling operation has been received from the selected polling circuit 131 (S205: Yes), the NAND I/F CPU 130 ends the control on the polling circuit 131. Then, the NAND I/F CPU 130 enters a state where it can transmit a next command to the bank to be subjected to the internal operation.

Figure 11:
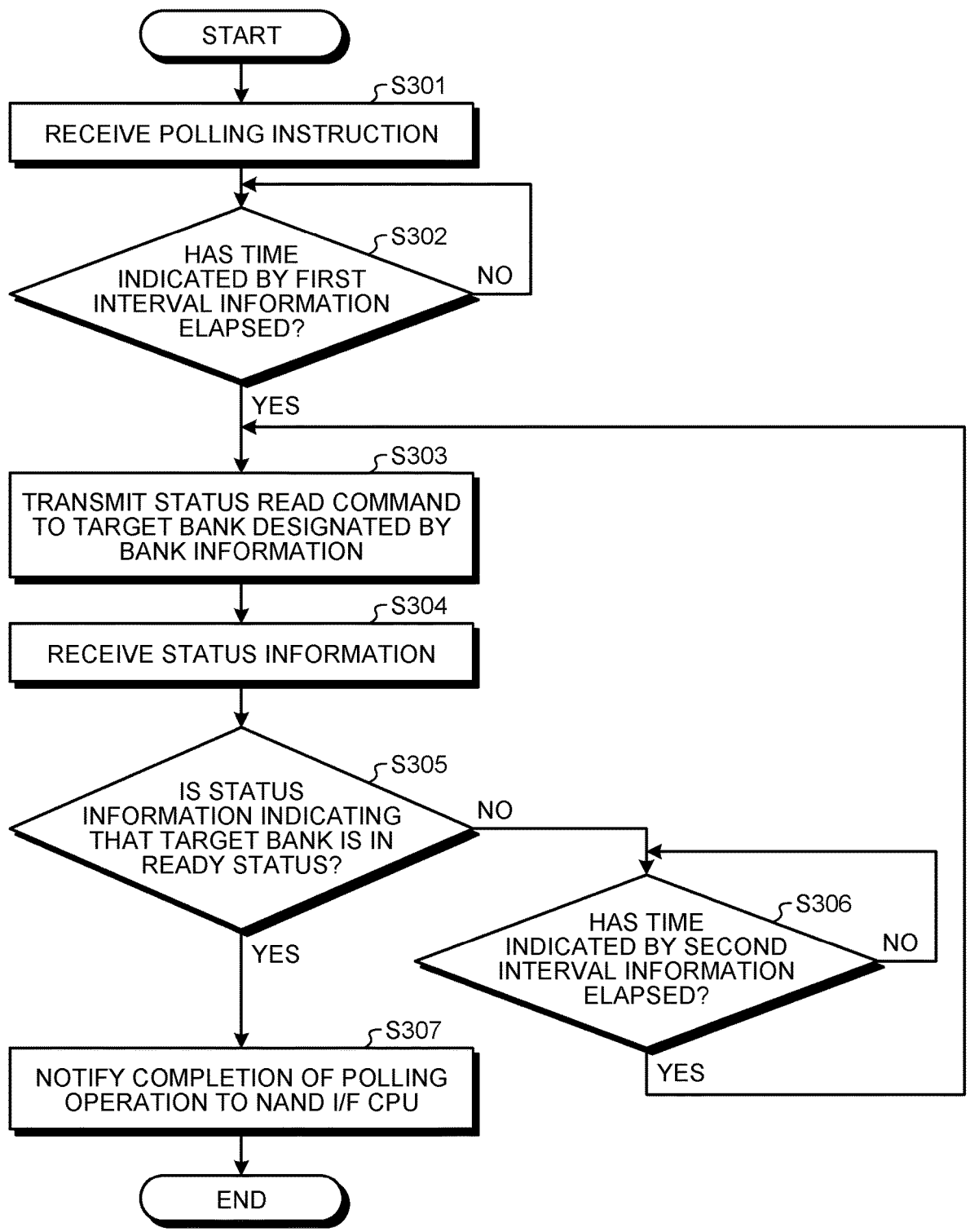
FIG. 11 is a diagram illustrating an example of a procedure of an operation of the polling circuit according to the first embodiment.

FIG. 11 is a diagram illustrating an example of a procedure of an operation of the polling circuit 131 according to the first embodiment.

When the polling circuit 131 has received a polling instruction (S301), the processor 135 included in the polling circuit 131 causes the timer circuit 137 to start time measurement. Subsequently, based on the measurement value by the timer circuit 137, the processor 135 determines whether the time indicated by the first interval information included in the polling instruction has elapsed since the reception of the polling instruction (S302). In a case where the time indicated by the first interval information has not elapsed (S302: No), the processor 135 executes the processing of step S302 again.

When the time indicated by the first interval information has elapsed (S302: Yes), the processor 135 transmits a status read command to the target bank designated by the bank information (S303). Next, the processor 135 receives the status information from the target bank (S304).

The processor 135 determines whether the status information indicates that the target bank is in the ready status (S305). In a case where the status information does not indicate that the target bank is in the ready status (S305: No), the processor 135 resets the timer circuit 137 and restarts the measurement of the time. Subsequently, based on the measurement value by the timer circuit 137, the processor 135 determines whether the time indicated by the second interval information included in the polling instruction has elapsed since the last transmission of the status read command (S306). When the time indicated by the second interval information has not elapsed (S306: No), the processor 135 executes the processing of step S306 again.

When the time indicated by the second interval information has elapsed (S306: Yes), the processor 135 executes the processing of step S303 again.

In a case where the status information indicates that the target bank is in the ready status (S305: Yes), the processor 135 gives, to the NAND I/F CPU 130, a notification of the completion of the polling operation (S307) to complete the series of operations.

In this manner, each polling circuit 131 is configured to be able to repeatedly execute an inquiry to the target bank every time the time designated by the interval information elapses.

The NAND I/F CPU 130 can cause the four polling circuits 131 to execute polling operations in parallel. This makes it possible to control the eight banks so that a maximum of four banks operate simultaneously at each moment. For example, the NAND I/F CPU 130 sequentially transmits a command for executing an internal operation to four banks among the eight banks while adjusting transmission timings so as not to overlap with each other. When the polling operation for a certain bank among the four banks is completed in one polling circuit 131, the NAND I/F CPU 130 can instruct the command I/F circuit 132 to transmit a command for causing the bank to execute an internal operation in parallel with the polling operation for the remaining three banks.

Figure 12:
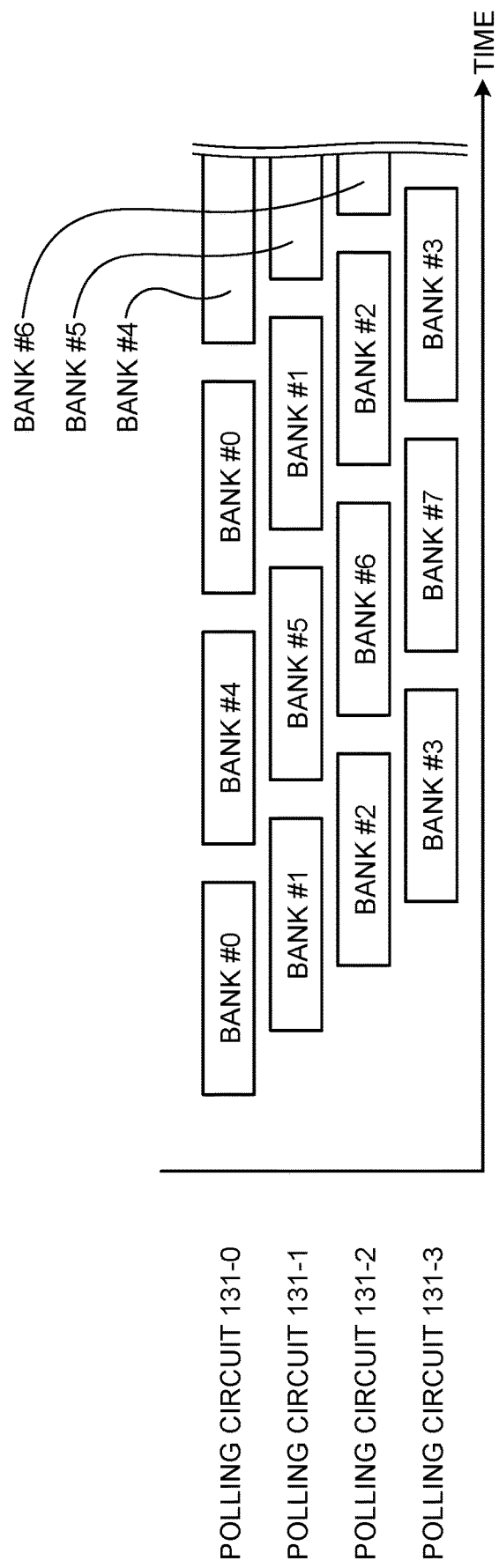
FIG. 12 is a schematic diagram illustrating an example of parallel operation of four polling circuits according to the first embodiment.

FIG. 12 is a schematic diagram illustrating an example of parallel operation of four polling circuits 131 according to the first embodiment. In FIG. 12, the horizontal axis represents time, and each rectangle represents a period during which the polling circuit 131 indicated by the vertical axis performs a polling operation. Each rectangle includes a number assigned to a bank to be monitored for the status. Note that any one of identification numbers 0 to 7 is to be assigned to the eight banks included in the NAND package PKG0.

In the example illustrated in FIG. 12, a polling operation for the bank #0 by the polling circuit 131-0, a polling operation for the bank #1 by the polling circuit 131-1, a polling operation for the bank #2 by the polling circuit 131-2, and a polling operation for the bank #3 by the polling circuit 131-3 are started in this order. The polling operation for the bank #0 by the polling circuit 131 0, the polling operation for the bank #1 by the polling circuit 131-1, the polling operation for the bank #2 by the polling circuit 131-2, and the polling operation for the bank #3 by the polling circuit 131-3 are completed in this order.

When the polling circuit 131-0 completes the polling operation for the bank #0, the polling circuit 131-0 starts a polling operation for the bank #4. When the polling circuit 131-1 completes the polling operation for the bank #1, the polling circuit 131-1 starts a polling operation for the bank #5. When the polling circuit 131-2 completes the polling operation for the bank #2, the polling circuit 131-2 starts a polling operation for the bank #6. When the polling circuit 131-3 completes the polling operation for the bank #3, the polling circuit 131-3 starts a polling operation for the bank #7. The polling operation for the bank #4 by the polling circuit 131-0, the polling operation for the bank #5 by the polling circuit 131-1, the polling operation for the bank #6 by the polling circuit 131-2, and the polling operation for the bank #7 by the polling circuit 131-3 are completed in this order.

When the polling circuit 131-0 completes the polling operation for the bank #4, the polling circuit 131-0 starts a polling operation for the bank #0. When the polling circuit 131-1 completes the polling operation for the bank #5, the polling circuit 131-1 starts a polling operation for the bank #1. When the polling circuit 131-2 completes the polling operation for the bank #6, the polling circuit 131-2 starts a polling operation for the bank #2. When the polling circuit 131-3 completes the polling operation for the bank #7, the polling circuit 131-3 starts a polling operation for the bank #3.

In this manner, each polling circuit 131 has a configuration to dynamically assign a bank to be monitored, making it possible to control parallel operations of the eight banks by the four polling circuits 131. That is, according to the first embodiment, it is possible to control the parallel operation of the eight banks with a smaller number of polling circuits 131 than eight, unlike the comparative example that needs eight polling circuits 131.

As described above, according to the first embodiment, the NAND I/F controller 13 includes the plurality of polling circuits 131 and the NAND I/F CPU 130. Each polling circuit 131 is configured to execute a polling operation to repeat an inquiry to a designated bank until the circuit detects that the status of the bank is a ready status. The NAND I/F CPU 130 issues a command to instruct one bank to execute an internal operation. In addition, the NAND I/F CPU 130 selects one of the polling circuits 131 that is not executing the polling operation. The NAND I/F CPU 130 then designates a command target bank for the selected polling circuit 131 and causes the selected polling circuit 131 to perform the polling operation.

Therefore, it is possible for the plurality of polling circuits 131 to control parallel operation of a larger number of banks than the number of polling circuits 131. This makes it possible to suppress an increase in circuit scale while preventing performance deterioration.

In addition, according to the first embodiment, while one polling circuit 131 is executing a polling operation for one bank, the NAND I/F CPU 130 can cause another polling circuit 131 to execute a polling operation for repeatedly inquiring a status of another bank.

Therefore, it is possible to cause the plurality of polling circuits 131 to execute polling operations for different banks in parallel.

In addition, according to the first embodiment, after one polling circuit 131 completes the polling operation for a certain bank, the NAND I/F CPU 130 can cause the polling circuit 131 to execute the polling operation for the same bank or a different bank.

This makes it possible to dynamically allocate a bank to each polling circuit 131.

Second Embodiment

The first embodiment has described the configuration in which the plurality of polling circuits 131 control the parallel operation of a larger number of banks than the number of the polling circuits 131. The second embodiment will describe a configuration in which the plurality of polling circuits 131 control the parallel operation of a smaller number of banks than the number of the polling circuits 131. Hereinafter, portions different from those of the first embodiment will be mainly described. Portions similar to those of the first embodiment will be briefly described or skipped.

Figure 13:
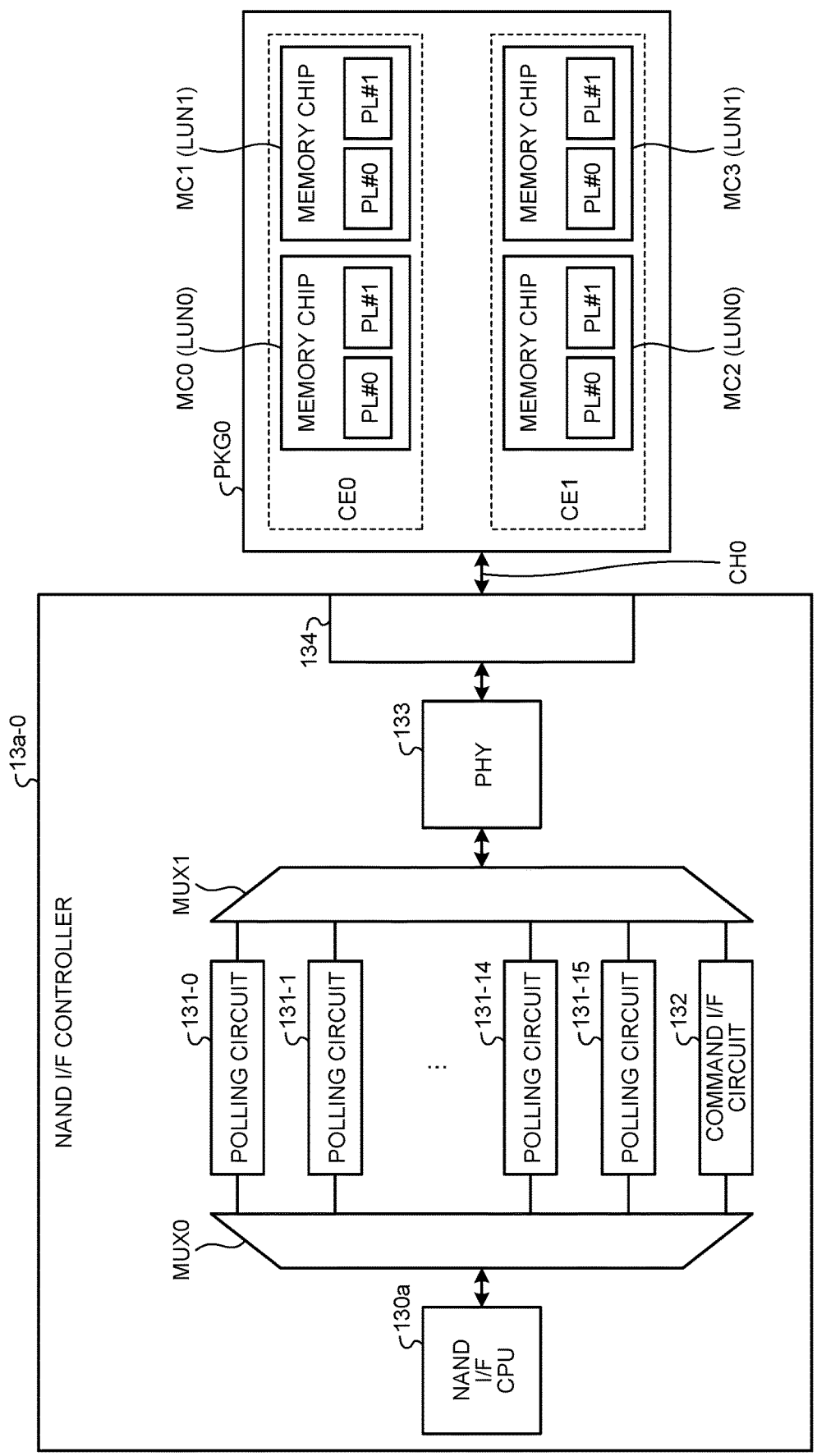
FIG. 13 is a schematic diagram illustrating an example of a configuration of a NAND I/F controller and one NAND package connected via one channel according to a second embodiment.

FIG. 13 is a schematic diagram illustrating an example of a configuration of a NAND I/F controller 13a and one NAND package PKG connected to the NAND I/F controller 13a via one channel according to the second embodiment. In FIG. 13, configurations including a NAND I/F controller 13a-0 and a NAND package PKG0 connected to each other via a channel CH0 are illustrated as representatives of a plurality of NAND I/F controllers 13a included in the memory controller 10 and a plurality of NAND packages PKG, respectively.

The NAND I/F controller 13a-0 includes a NAND I/F CPU 130a, multiplexers MUX0 and MUX1, sixteen polling circuits 131-0 to 131-15, a command I/F circuit 132, a PHY circuit 133, and a terminal group 134.

The NAND package PKG0 has a configuration similar to that of the first embodiment. That is, the NAND package PKG0 includes eight banks.

The NAND I/F CPU 130a can cause each bank to execute a cache access operation. The cache access operation includes a cache write operation and a cache read operation.

Figure 14:
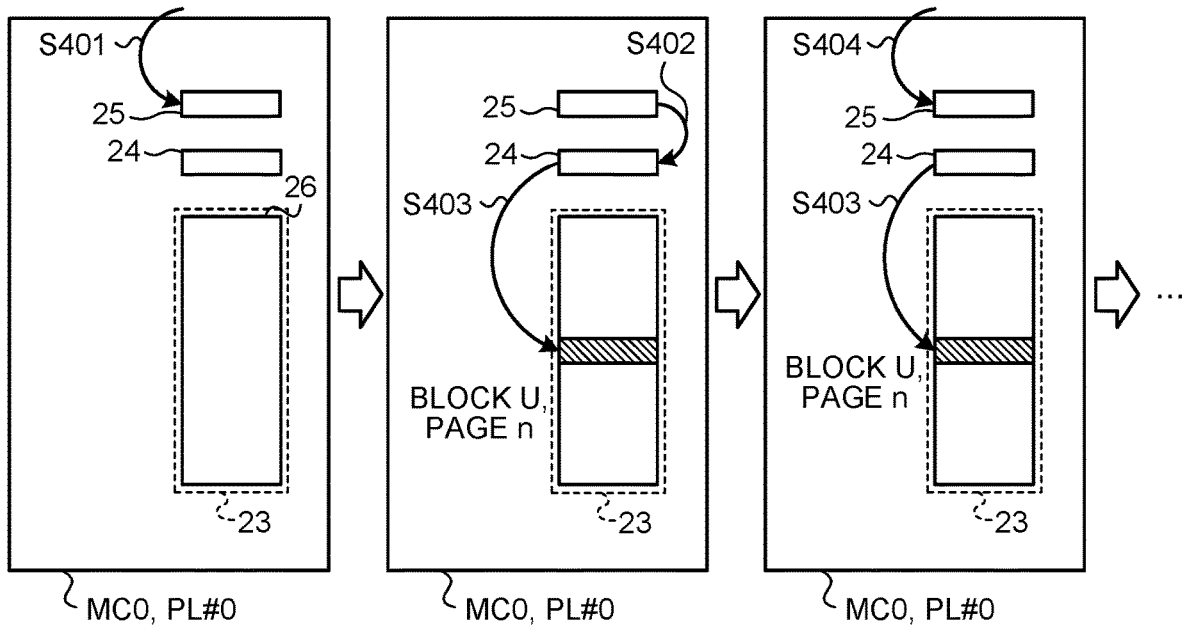
FIG. 14 is a schematic diagram illustrating a cache write operation according to the second embodiment.

FIG. 14 is a schematic diagram illustrating a cache write operation according to the second embodiment. Here, the cache write operation for the plane PL #0 of the memory chip MC0 will be described as an example, whereas the NAND I/F CPU 130a can cause other banks to execute a similar cache write operation.

As a first step of the cache write operation, a data-in operation of inputting write data to the data cache 25 is executed (S401). It is assumed that a write destination of the write data is "page n" of "block U".

Subsequently, the write data input to the data cache 25 is transferred to the page buffer 24 (S402). The write data transferred to the page buffer 24 is written to page n of block U by a program operation (S403).

After the write data is transferred from the data cache 25 to the page buffer 24, the data cache 25 can receive an input of write data to be written next even when the program operation in step S403 is under execution. Thus, while the program operation of step S403 is under execution, a data-in operation to input new write data to the data cache 25 is executed (S404).

When the program operation in step S403 is completed, the page buffer 24 becomes available. Thus, the new write data input to the data cache 25 in step S404 is transferred from the data cache 25 to the page buffer 24 in a procedure similar to steps S402 and S403, and thereafter is written to another position of the subarray 23 by the program operation.

In this manner, according to the cache write operation, the data-in operation to input next write data to the data cache 25 is executed during the program operation to write certain write data to the subarray 23. Therefore, when data for a plurality of pages is sequentially written, it is possible to shorten the total time required for the write operation for the plurality of pages.

Figure 15:
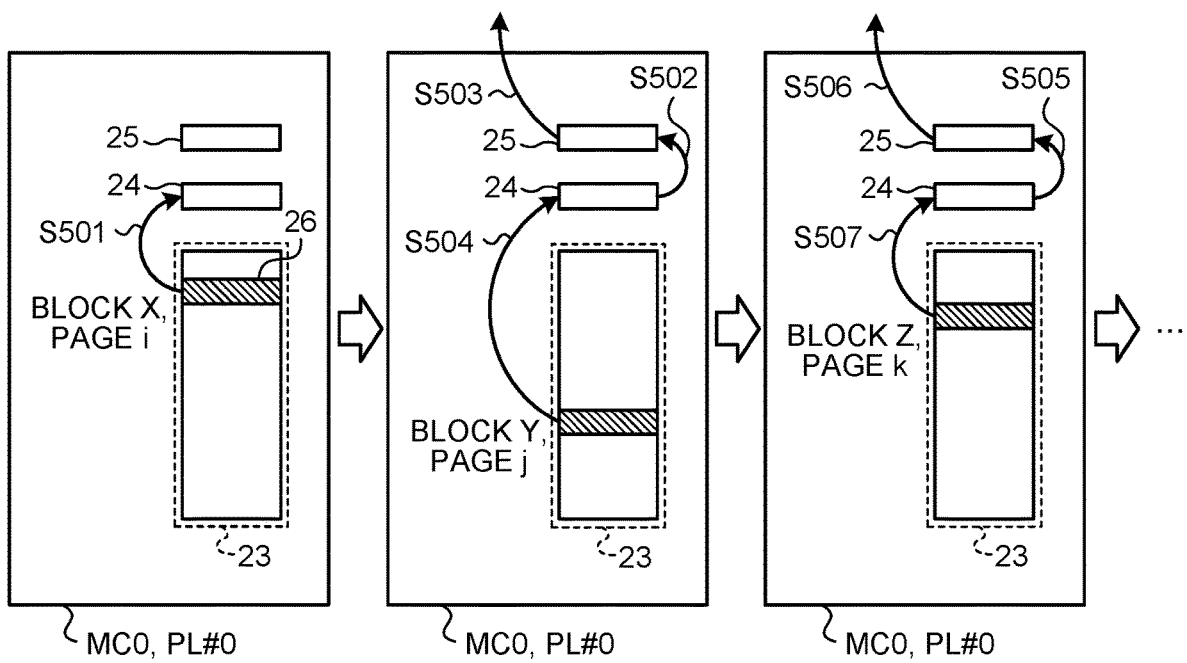
FIG. 15 is a schematic diagram illustrating a cache read operation according to the second embodiment.

FIG. 15 is a schematic diagram illustrating a cache read operation according to the second embodiment. Here, the cache read operation for the plane PL #0 of the memory chip MC0 will be described as an example, whereas the NAND I/F CPU 130a can cause other banks to execute a similar cache read operation.

As a first step of the cache read operation, a sense operation is executed (S501). Here, the read data is transferred from page i of block X to the page buffer 24 by the sense operation. The read data stored in the page buffer 24 is transferred to the data cache 25 (S502). The read data stored in the data cache 25 is then output to the NAND I/F controller 13a-0 by the data-out operation (S503).

In parallel with the data-out operation in step S503, a sense operation for another read data is executed (S504). Here, the sense operation to transfer the read data from page j of block Y to the page buffer 24 is executed. The execution period of the process of step S504 partially or entirely overlaps with the execution period of the process of step S503. After steps S503 and S504, the read data stored in the page buffer 24 is transferred to the data cache 25 (S505). The read data stored in the data cache 25 is then output to the NAND I/F controller 13a-0 by the data-out operation (S506).

In parallel with the data-out operation in step S506, a sense operation for still another read data is executed (S507). Here, the sense operation to transfer the read data from page k of block Z to the page buffer 24 is executed. The execution period of the process of step S507 partially or entirely overlaps with the execution period of the process of step S506.

In this manner, in the cache read operation, the sense operation to read the next read data from the subarray 23 is executed during the data-out operation to output certain read data from the data cache 25. Therefore, in a case where data for a plurality of pages is sequentially read, it is possible to shorten the total time required for the read operation for the plurality of pages.

In the cache write operation and the cache read operation, if the NAND I/F controller 13a-0 can access the data cache 25, access to the data cache 25 (data-in operation or data-out operation) is executed regardless of whether an internal operation (program operation or sense operation) is under execution.

In the second embodiment, status information output from the memory chip MC in accordance with a status read command includes true ready/true busy information and cache ready/cache busy information.

The true ready/true busy information indicates whether the bank is in a state where the internal operation is completed (that is, a true ready status). The true busy status is a state where the internal operation is not completed.

The cache ready/cache busy information indicates whether the bank is in a state where access to the data cache 25 (for example, a data-in operation to input data to the data cache 25) is possible (that is, a cache ready status). The cache busy status is a state where access to the data cache 25 is not possible.

The memory chip MC outputs the status information in accordance with the status read command. In one example, the status information has an 8-bit width and is transmitted as data signals DQ0 to DQ7. Specifically, for example, a bit that is transmitted in DQ5 in the status information indicates the cache ready/cache busy information. Moreover, a bit that is transmitted in DQ6 indicates the true ready/true busy information.

According to the configuration example illustrated in FIG. 13, the number of polling circuits 131 is larger than the number of banks included in the package PKG0. Therefore, according to the second embodiment, by using the extra polling circuits 131, the cache ready/cache busy information and the true ready/true busy information are individually monitored by different polling circuits 131.

As an example, an execution timing of a polling operation in the cache write operation will be described. FIG. 16 is a timing chart illustrating an example of the execution timing of the polling operation in the cache write operation according to the second embodiment. FIG. 16 illustrates the command transmission timing, the transition timing between the true ready status and the true busy status, the transition timing between the cache ready status and the cache busy status, and the execution timing of the data-in operation. In the example illustrated in FIG. 16, write data D0, write data D1, and write data D2 are to be input to a bank in this order. In the chart illustrating the transition timing between the true ready status and the true busy status, a high (H) level indicates the true ready status, and a low (L) level indicates the true busy status. In the chart indicating the transition timing between the cache ready status and the cache busy status, the H level indicates the cache ready status, and the L level indicates the cache busy status.

First of all, at time t0, the status of the target bank is the true ready status and the cache ready status. Then, at time t0, the NAND I/F CPU 130a starts a data-in operation to input the write data DO to the data cache 25 of the target bank. At the end of the data-in operation (time t1), the NAND I/F CPU 130a issues a program command C0 of the start of the program operation, and then, the program command C0 is input to the target bank.

When the input of the write data DO is completed at time t1, the write data DO is transferred from the data cache 25 to the page buffer 24, and then the program operation of the write data DO is started. At the timing (that is, at time t1) of starting the transfer of the write data DO from the data cache 25 to the page buffer 24, the status of the target bank transitions from the true ready status to the true busy status. In addition, at time t1, the data cache 25 becomes inaccessible, whereby the status of the target bank transitions from the cache ready status to the cache busy status.

When the transfer of the write data DO from the data cache 25 to the page buffer 24 is completed (time t2), the data cache 25 becomes accessible again. Accordingly, the status of the target bank transitions from the cache busy status to the cache ready status. However, at time t2, since the program operation of the write data DO is not completed, the status of the target bank is maintained at the true busy status.

When the status of the target bank transitions from the cache busy status to the cache ready status at time t2, the NAND I/F CPU 130a starts a data-in operation to input the write data D1, which is the next write data, to the data cache 25 of the target bank. At the end of the data-in operation (time t3), the NAND I/F CPU 130a issues a program command C0 instructing the start of a program operation, and then the program command C0 is input to the target bank. In addition, at time t3, the data cache 25 becomes inaccessible, whereby the status of the target bank transitions from the cache ready status to the cache busy status.

At time t4, the target bank completes the program operation of the write data DO. Accordingly, the target bank starts the program operation of the write data D1 input subsequently to the write data DO. Therefore, the status of the target bank is still maintained at the true busy status.

The time required for the program operation of one piece of write data is expressed by a time tProg. A period from time t1 to time t4 corresponds to the time tProg required for the program operation of the write data D0.

When the status of the target bank transitions from the cache busy status to the cache ready status at time t5, the NAND I/F CPU 130a starts a data-in operation to input the write data D2, which is the next write data, to the data cache 25 of the target bank. At the end of the data-in operation (time t6), the NAND I/F CPU 130a issues a program command C0 instructing the start of a program operation, and then the program command C0 is input to the target bank. In addition, at time t6, the data cache 25 becomes inaccessible, whereby the status of the target bank transitions from the cache ready status to the cache busy status.

At time t7, the target bank completes the program operation of the write data D1. Accordingly, the target bank starts the program operation of the write data D2 input subsequently to the write data D1. Therefore, the status of the target bank is still maintained at the true busy status.

A period from time t4 to time t7 corresponds to the time tProg required for the program operation of the write data D1.

At time t8, the status of the target bank transitions from the cache busy status to the cache ready status. In the example illustrated in FIG. 16, since there is no write data to be subsequently input, no data-in operation is executed.

At time t9, the target bank completes the program operation of the write data D2. Accordingly, the status of the target bank transitions from the true busy status to the true ready status. Since there is still no write data to be input subsequently, the NAND I/F CPU 130a transmits a cache write end command C1 instructing the end of the cache write operation, to the target bank.

A period from time t7 to time t9 corresponds to the time tProg required for the program operation of the write data D2.

In the series of operations illustrated in FIG. 16, each of the period from time t1 to time t2, the period from time t3 to time t5, and the period from time t6 to time t8 is a period in which the status of the target bank is maintained at the cache busy status. The NAND I/F CPU 130a causes a certain polling circuit 131 (the polling circuit 131-0 in the example of FIG. 16) to monitor each of the period from time t1 to time t2, the period from time t3 to time t5, and the period from time t6 to time t8.

The polling circuit 131-0 transmits a status read command to the target bank at a time interval designated by the interval information. By making reference to the bit received as DQ5 in the bit group constituting the status information received as a response, the polling circuit 131-0 determines whether the status of the target bank is the cache ready status.

When the polling circuit 131-0 has detected that the status of the target bank is the cache ready status, the polling circuit 131-0 gives, to the NAND I/F CPU 130a, a notification of the completion of the polling operation. By the notification of the completion of the polling operation, the NAND I/F CPU 130a recognizes that the data cache 25 of the target bank becomes accessible, and then inputs the next write data and the command C0.

In the series of operations illustrated in FIG. 16, the period from time t1 to time t9 is a period in which the status of the target bank is maintained at the true busy status. The NAND I/F CPU 130a causes a polling circuit 131 that is not executing the polling operation (the polling circuit 131-1 in the example of FIG. 16) to monitor the period from time t1 to time t9.

The polling circuit 131-1 transmits a status read command to the target bank at a time interval designated by the interval information. By making reference to the bit received as DQ6 in the bit group constituting the status information received as a response, the polling circuit 131-1 determines whether the status of the target bank is the true ready status.

When the polling circuit 131-1 has detected that the status of the target bank is the true ready status, the polling circuit 131-1 gives, to the NAND I/F CPU 130a, a notification of the completion of the polling operation. By the notification of the completion of the polling operation, the NAND I/F CPU 130a recognizes that the target bank is not operating at all. At this time, if there is no write data addressed to the target bank subsequent to the write data D2, the NAND I/F CPU 130a transmits the cache write end command C1 to the target bank to end the cache write operation.

Here, a second comparative example will be described. According to the second comparative example, one polling circuit is caused to monitor the cache ready status and the cache busy status of the target bank. At the timing when the polling circuit detects that the status of the target bank becomes the cache ready status, the polling circuit is caused to monitor the true ready status/true busy status of the target bank. According to such a configuration, from the viewpoint of the memory controller, even when the status of the target bank transitions to the cache ready status where the next data-in operation can be performed, it would not be possible to detect the transition unless the monitoring is explicitly performed again. This deteriorates the efficiency of the cache write operation.

In contrast, according to the second embodiment, after transmitting a command instructing execution of an internal operation to the target bank, the NAND I/F CPU 130a instructs one polling circuit 131 among the plurality of polling circuits 131 to perform a polling operation for monitoring whether the status of the target bank is a true ready status, and instructs another one polling circuit 131 among the plurality of polling circuits 131 to perform a polling operation for monitoring whether the status of the target bank is a cache ready status.

Therefore, it is not necessary to perform monitoring again, making it possible to perform the cache access operation with high efficiency. This can suppress deterioration of the efficiency of the cache write operation.

Moreover, according to the second embodiment, while controlling the program operation in the cache write operation based on the result of monitoring the cache ready status by one polling circuit 131, the NAND I/F CPU 130a can determine the end of the program operation in the cache write operation based on the result of monitoring the true ready status by another polling circuit 131. This can suppress the load of the NAND I/F CPU 130a, leading to improvement of the use efficiency of the plurality of memory chips MC.

Note that, in the first embodiment, each NAND I/F controller 13 includes a smaller number of the polling circuits 131 than the number of banks. The first embodiment can be applied even when each NAND I/F controller 13 includes the same or a larger number of polling circuits 131 than the number of banks.

Moreover, in the second embodiment, each NAND I/F controller 13a includes a larger number of the polling circuits 131 than the number of banks. The second embodiment can be applied even when each NAND I/F controller 13a includes the same or a smaller number of polling circuits 131 than the number of banks.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
   one or more channels;
   a first number of memory elements; and
   a memory controller that is connected to the first number of memory elements via the one or more channels and includes:
   a second number of polling circuits, the second number being smaller than the first number; and
   a first processor configured to:
   determine one or more polling circuits not executing a polling operation among the second number of polling circuit;
   select a polling circuit that is not executing the polling operation among the determined one or more polling circuits; and
   designate, for the selected polling circuit, one memory element out of the first number of memory elements and cause the selected polling circuit to execute the polling operation on the designated one memory element, wherein
   each of the second number of polling circuits is configured to, in response to the designation by the first processor, execute the polling operation,
   the polling operation being an operation to repeat an inquiry to the designated memory element until detecting that a status of the designated memory element is changed from a busy status to a ready status, the busy status being a status in which the designated memory element cannot receive, from the memory controller, any of commands for instructing input/output of data or execution of an internal operation, the ready status being a status in which the designated memory element can receive, from the memory controller, a command instructing the input/output of data or execution of the internal operation,
   the inquiry includes:
   issuing, via one of the one or more channels, a status read command to the designated memory element;
   receiving, via the one of the one or more channels, status information from the designated memory element; and
   determining whether the status of the designated memory elements is the busy status or the ready status, based on the received status information;
   wherein
   the first number of memory elements include at least a first memory element and a second memory element,
   the second number of polling circuits include at least a first polling circuit and a second polling circuit, and
   the first processor is configure to perform processing while the first polling circuit is executing the polling operation on the first element, the processing including:
   issuing a first command to instruct the second memory element to execute an internal operation;
   selecting the second polling circuit that is not executing the polling operation; and
   designated the second memory element for the second polling circuit, and causing the second polling circuit to execute the polling operation on the designated second memory element.

2. The memory system according to claim 1, wherein the first number of memory elements further include a third memory element, and
   the first processor is configured to perform processing after the first polling circuit completes the polling operation on the first memory element, the processing including:
   issuing a second command to instruct the third memory element to execute an internal operation; and
   designating the third memory element for the first polling circuit, and causing the first polling circuit to execute the polling operation on the designated third memory element.

3. The memory system according to claim 1, wherein
the first number of memory elements include at least a fourth memory element,
the second number of polling circuits include at least a third polling circuit and a fourth polling circuit,
each of the first number of memory elements includes:
   a memory cell array;
   a first buffer memory configured to buffer data to be written to the memory cell array and buffer data read from the memory cell array; and
   a second buffer memory configured to buffer transfer data exchanged with the memory controller,
the polling operation includes:
   a first polling operation to repeat an inquiry to the designated memory element until the selected polling circuit detects that the designated memory element is in a first ready status where the designated memory element is not executing an internal operation; and
   a second polling operation to repeat an inquiry to the designated memory element until the selected polling circuit detects that the second buffer memory of the designated memory element is in a second ready status where the second buffer memory is accessible, and
the first processor is further configured to perform processing including:
   issuing a third command to instruct the fourth memory element to execute an internal operation;
   selecting the third polling circuit that is not executing the polling operation;
   designating the fourth memory element for the third polling circuit, and causing the third polling circuit to execute the first polling operation on the designated fourth memory element;
   selecting the fourth polling circuit that is not executing the polling operation; and
   designating the fourth memory element for the fourth polling circuit, and causing the fourth polling circuit to execute the second polling operation on the designated fourth memory element.

4. The memory system according to claim 1, wherein
each of the second number of polling circuits is configured to transmit a notification to the first processor in a case where each of the second number of polling circuits detects that the status of the designated memory element is the ready status after starting the polling operation.

5. The memory system according to claim 1, wherein each of the second number of polling circuits includes:
   a timer circuit;
   a memory configured to store a command sequence of the status read command; and
   a second processor configured to measure a lapse of preset time by controlling the timer circuit and perform the inquiry at intervals of the preset time in accordance with the command sequence stored in the memory.

6. The memory system according to claim 1, wherein
the memory controller is configured to operate the first number of memory elements in parallel by a bank interleaving method.

7. A method of controlling a first number of memory elements by a memory controller, the memory controller being connected to the first number of memory elements via one or more channels and including a second number of polling circuits, the second number being smaller than the first number, the method comprising:
managing the first number of memory elements and the second number of polling circuits;
determining one or more polling circuit not executing a polling operating among the second number of polling circuits;
selecting a polling circuit that is not executing the polling among the determined one or more polling circuits; and
designating, for the selected polling circuit, one memory element out of the first number of memory elements and causing the selected polling circuit to execute the polling operation on the designed one memory element, wherein
each of the second number of polling circuits is configured to, in response to the designation, execute the polling operation,
the polling operation being an operation to repeat an inquiry to the designated memory element until detecting that a status of the designated memory element is changed from a busy status to a ready status, the busy status being a status in which the designated memory element cannot receive, from the memory controller, any of commands for instructing input/output of data or execution of an internal operation, the ready status being a status in which the designated memory element can receive, from the memory controller, a command instructing the input/output of data or execution of the internal operation,
the inquiry includes:
   issuing, via one of the one or more channels, a status read command to the designed memory element;
   receiving, via the one of the one or more channels, status information from the designated memory element; and
   determining whether the status of the designated memory element is the busy status or the ready status, based on the received status information;
wherein
the first number of memory elements include at least a first memory element and a second memory element,
the second number of polling circuits include at least a first polling circuit and a second polling circuit, and
the method further comprises:
performing processing while the first polling circuit is executing the polling operation on the first memory element, the processing including:
   issuing a first command to instruct the second memory element to execute an internal operation;
   selecting the second polling circuit that is not executing the polling operation; and
   designating the second memory element for the second polling circuit, and causing the second polling circuit to execute the polling operation on the designated second memory element.

8. The method according to claim 7, wherein
the first number of memory elements further include a third memory element, and
the method further comprises:
performing processing after the first polling circuit completes the polling operation on the first memory element, the processing including:
   issuing a second command to instruct the third memory element to execute an internal operation; and
   designating the third memory element for the first polling circuit, and causing the first polling circuit to execute the polling operation on the designated third memory element.

9. The method according to claim 7, wherein
the first number of memory elements include at least a fourth memory element,
the second number of polling circuits include at least a third polling circuit and a fourth polling circuit,
each of the first number of memory elements includes:
  a memory cell array;
  a first buffer memory configured to buffer data to be written to the memory cell array and buffer data read from the memory cell array; and
  a second buffer memory configured to buffer transfer data exchanged with the memory controller,
the polling operation includes:
  a first polling operation to repeat an inquiry to the designated memory element until the selected polling circuit detects that the designated memory element is in a first ready status where the designated memory element is not executing an internal operation; and
  a second polling operation to repeat an inquiry to the designated memory element until the selected polling circuit detects that the second buffer memory of the designated memory element is in a second ready status where the second buffer memory is accessible, and
the method further comprises:
  issuing a third command to instruct the fourth memory element to execute an internal operation;
  selecting the third polling circuit that is not executing the polling operation;
  designating the fourth memory element for the third polling circuit, and causing the third polling circuit to execute the first polling operation on the designated fourth memory element;
  selecting the fourth polling circuit that is not executing the polling operation; and
  designating the fourth memory element for the fourth polling circuit, and causing the fourth polling circuit to execute the second polling operation on the designated fourth memory element.

10. The method according to claim 7, wherein
the memory controller further includes a first processor, and
the method further comprises:
transmitting, by each of the second number of polling circuits, a notification to the first processor in a case where each of the second number of polling circuits detects that the status of the designated memory element is the ready status after starting the polling operation.

11. The method according to claim 7, further comprising:
storing, in a memory, a command sequence of the status read command; and
measuring a lapse of preset time by controlling a timer circuit and performing the inquiry at intervals of the preset time in accordance with the command sequence stored in the memory.

12. The method of claim 7, further comprising:
operating the first number of memory elements in parallel by a bank interleaving method.

* * * * *